(12) United States Patent
Lee et al.

(10) Patent No.: US 10,588,019 B2
(45) Date of Patent: Mar. 10, 2020

(54) SECURE SIGNALING BEFORE PERFORMING AN AUTHENTICATION AND KEY AGREEMENT

(71) Applicant: QUALCOMM Incorporated, San Diego, CA (US)

(72) Inventors: Soo Bum Lee, San Diego, CA (US); Lenaig Genevieve Chaponniere, La Jolla, CA (US); Anand Palanigounder, San Diego, CA (US); Adrian Edward Escott, Reading (GB); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 15/345,077

(22) Filed: Nov. 7, 2016

(65) Prior Publication Data

US 2017/0325094 A1 Nov. 9, 2017

Related U.S. Application Data

(60) Provisional application No. 62/332,378, filed on May 5, 2016.

(51) Int. Cl.
*H04M 1/66* (2006.01)
*H04W 12/08* (2009.01)
(Continued)

(52) U.S. Cl.
CPC ....... *H04W 12/08* (2013.01); *H04W 12/0017* (2019.01); *H04W 12/04* (2013.01);
(Continued)

(58) Field of Classification Search
CPC ..... H04W 12/02; H04W 12/04; H04W 12/06; H04W 76/02; H04W 8/06; H04W 12/08;
(Continued)

(56) References Cited

U.S. PATENT DOCUMENTS

| 7,900,039 B2 * | 3/2011 | Shim ..................... H04L 63/166 380/272 |
| 7,958,548 B2 * | 6/2011 | Busboom ................ H04L 63/10 713/168 |

(Continued)

OTHER PUBLICATIONS

ISA/EP, International Search Report and Written Opinion of the International Searching Authority, Int'l Application No. PCT/US2017/030193, dated Aug. 4, 2017, European Patent Office, Rijswijk, NL, 15 pgs.

(Continued)

*Primary Examiner* — Khoi H Tran
*Assistant Examiner* — B M M Hannan
(74) *Attorney, Agent, or Firm* — Holland & Hart LLP

(57) ABSTRACT

Techniques are described for wireless communication. A wireless device may generate a secured query message based at least in part on a security credential of the wireless device. The secured query message may be generated prior to performing an authentication and key agreement (AKA) with a network. The wireless device may transmit the secured query message to the network, and receive a response to the secured query message. The wireless device may then determine whether or not to perform the AKA with the network based on the received response (e.g., the wireless device may determine whether or not the response is associated with the security credential of the wireless communication device and a network security credential of the network). The wireless device may establish a secure connection with the network or refrain from considering the response based on the determination.

30 Claims, 24 Drawing Sheets

(51) Int. Cl.
  *H04W 12/06* (2009.01)
  *H04W 12/00* (2009.01)
  *H04W 12/04* (2009.01)
  *H04L 29/06* (2006.01)

(52) U.S. Cl.
  CPC ....... *H04W 12/06* (2013.01); *H04W 12/0602* (2019.01); *H04L 63/0823* (2013.01); *H04L 63/166* (2013.01)

(58) Field of Classification Search
  CPC . H04L 63/166; H04L 63/0869; H04L 9/3273; H04L 63/0823
  USPC ........................................ 455/411
  See application file for complete search history.

(56) References Cited

U.S. PATENT DOCUMENTS

| | | | | |
|---|---|---|---|---|
| 8,065,518 | B1* | 11/2011 | Henry | H04W 12/06 713/158 |
| 9,906,511 | B1* | 2/2018 | Kolman | H04K 63/08 |
| 2005/0044365 | A1* | 2/2005 | Haukka | H04L 9/0844 713/171 |
| 2006/0182280 | A1 | 8/2006 | Laitinen et al. | |
| 2006/0206709 | A1* | 9/2006 | Labrou | G06Q 20/18 713/167 |
| 2006/0281441 | A1* | 12/2006 | Okochi | G06Q 30/0225 455/411 |
| 2007/0060097 | A1* | 3/2007 | Edge | H04L 29/06027 455/404.1 |
| 2007/0213033 | A1* | 9/2007 | Alper | H04L 63/08 455/411 |
| 2008/0137553 | A1* | 6/2008 | Hsu | H04W 12/06 370/254 |
| 2009/0147951 | A1* | 6/2009 | Kuo | H04W 12/04 380/44 |
| 2010/0058064 | A1* | 3/2010 | Kirovski | H04L 9/3073 713/176 |
| 2010/0125732 | A1* | 5/2010 | Cha | H04L 63/107 713/166 |
| 2011/0211559 | A1* | 9/2011 | Lim | H04W 36/02 370/331 |
| 2011/0261961 | A1* | 10/2011 | Dharmaraju | H04W 12/04 380/277 |
| 2012/0100833 | A1* | 4/2012 | Gao | H04L 9/0844 455/411 |
| 2012/0231760 | A1* | 9/2012 | Zhu | H04W 4/90 455/404.1 |
| 2013/0252583 | A1* | 9/2013 | Brown | H04W 12/06 455/411 |
| 2013/0310006 | A1* | 11/2013 | Chen | H04W 12/04 455/411 |
| 2014/0094145 | A1* | 4/2014 | Takahashi | H04W 12/06 455/411 |
| 2014/0325623 | A1* | 10/2014 | Johansson | H04L 63/0823 726/6 |
| 2015/0139424 | A1* | 5/2015 | Campagna | H04L 9/0866 380/270 |
| 2015/0304847 | A1* | 10/2015 | Gong | H04L 63/0869 455/411 |
| 2016/0127475 | A1* | 5/2016 | PalChaudhuri | H04L 67/28 709/203 |
| 2016/0205550 | A1* | 7/2016 | Rajadurai | H04W 4/90 455/411 |
| 2017/0201937 | A1* | 7/2017 | Zhang | H04W 8/20 |
| 2018/0097807 | A1* | 4/2018 | Hahn | H04W 8/06 |

OTHER PUBLICATIONS

Lai, et al., "SE-AKA: A Secure and Efficient group Authentication and Key Agreement Protocol for LTE Networks," Computer Networks, Dec. 9, 2013, pp. 3492-3510. vol. 57, No. 17, XP055394187, Elsevier.
Li et al., "Security Enhanced Authentication and Key Agreement Protocol for LTE/SAE Network," 7th International Conference on Wireless Communications, Networking and Mobile Computing (WiCOM), Sep. 23, 2011, 4 pgs., XP055394176.
Purkhiabani et al., "Enhanced Authentication and Key Agreement Procedure of Next Generation Evolved Mobile Networks", IEEE 3rd International Conference on Communication Software and Networks (ICCSN), May 27, 2011, 7 pgs., XP032050833, institute of Electrical and Electronics Engineers.

* cited by examiner

SECURE SIGNALING BEFORE PERFORMING AN AUTHENTICATION AND KEY AGREEMENT

CROSS REFERENCES

The present Application for Patent claims priority to U.S. Provisional Patent Application No. 62/332,378 by Lee, et al., entitled "Secure Signaling Before Performing An Authentication And Key Agreement," filed May 5, 2016, assigned to the assignee hereof.

INTRODUCTION

The present disclosure, for example, relates to wireless communication systems, and more particularly to techniques for transmitting or receiving secure signaling before performing an authentication and key agreement (AKA).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (radio heads (RHs)) in communication with a number of access node controllers (ANCs), where a set of one or more radio heads, in communication with an ANC, may define an eNB. A base station or radio head may communicate with a set of UEs on downlink channels (e.g., for transmissions from a base station or radio head to a UE) and uplink channels (e.g., for transmissions from a UE to a base station or radio head).

In some examples, a UE and a network device (e.g., a network access device (e.g., a radio head, a base station, an eNB, or an ANC) or central node of a core network (e.g., a mobility management entity (MME)) may perform an AKA. Messages transmitted between the UE and the network device after the AKA is performed are secured, but messages transmitted between the UE and the network device before the AKA is performed are not secured.

SUMMARY

In one example, a method of wireless communication at a wireless communication device is described. The method may include generating a secured query message based at least in part on a security credential of the wireless communication device. The secured query message may be generated prior to performing an AKA with a network. The method may further include transmitting the secured query message to the network; receiving a response to the secured query message; and determining whether to perform the AKA with the network based at least in part on the received response.

In one example, a method of wireless communication at a wireless communication device is described. The method may include generating a secured query message based at least in part on a security credential of the wireless communication device. The secured query message may be generated prior to performing an AKA with a network. The method may further include transmitting the secured query message to the network; receiving a response to the secured query message; and determining whether to perform the AKA with the network based at least in part on the received response.

In some examples, the method may include establishing a secure connection with the network based at least in part on the security credential of the wireless communication device and a network security credential of the network, and the secured query message may be transmitted to the network using the secure connection. In some examples, establishing the secure connection may include establishing the secure connection with a core network. In some examples, establishing the secure connection may include performing a transport layer security (TLS) handshake over a non-access stratum (NAS). In some examples, establishing the secure connection may include establishing the secure connection with a network access device. In some examples, establishing the secure connection may include performing a TLS handshake over a radio resource control (RRC) connection. In some examples, the method may include performing the AKA using the secure connection. In some examples, the wireless communication device may be associated with a first mobile network of a home mobile network operator (MNO), and the method may include obtaining at least one of: a first security credential of a roaming MNO from the first mobile network; or a second security credential of the roaming MNO from a second mobile network of the roaming MNO, the second security credential signed by the home MNO; or a third security credential of the roaming MNO from a certificate authority common to the home MNO and the roaming MNO; or a combination thereof.

In some examples, the method may include determining a network supports receipt of a secured query message. In some examples, the determining may be based at least in part on a network advertisement. In some examples, the method may include receiving a non-secured message from the network, and the secured query message may be generated in response to the non-secured message. In some examples, the secured query message may be further generated based at least in part on a network security credential of the network. In some examples, the secured query message may be secured based at least in part on pairing-based cryptography. In some examples, the pairing-based cryptography may include at least one of: an identity-based encryption, an identity-based signature, or a combination thereof. In some examples, the method may include determining the response is associated with the security credential of the wireless communication device and a network security credential of the network, and determining whether to perform the AKA with the network based at least in part on the response. In some examples, the method may include determining the response is not associated with: the security credential of the wireless communication device, a network security credential of the network, or a combination thereof and refraining from considering the response when determining whether to perform the AKA with the network. In some examples, the secured query message may include: an access request, a network capability query, a service query, or a combination thereof. In some examples, the response may include a message that causes the wireless communication device a denial of service.

In one example, an apparatus for wireless communication at a wireless communication device is described. The apparatus may include means for generating a secured query message based at least in part on a security credential of the wireless communication device. The secured query message may be generated prior to performing an AKA with a network. The apparatus may further include means for transmitting the secured query message to the network; means for receiving a response to the secured query message; and means for determining whether to perform the AKA with the network based at least in part on the received response.

In some examples, the apparatus may include means for establishing a secure connection with the network based at least in part on the security credential of the wireless communication device and a network security credential of the network, and the secured query message may be transmitted to the network using the secure connection. In some examples, the means for establishing the secure connection may include means for establishing the secure connection with a core network. In some examples, the means for establishing the secure connection may include means for performing a TLS handshake over a NAS. In some examples, the means for establishing the secure connection may include means for establishing the secure connection with a network access device. In some examples, the means for establishing the secure connection may include means for performing a TLS handshake over a RRC connection. In some examples, the apparatus may include means for performing the AKA using the secure connection. In some examples, the wireless communication device may be associated with a first mobile network of a home MNO, and the apparatus may include means for obtaining at least one of: a first security credential of a roaming MNO from the first mobile network; or a second security credential of the roaming MNO from a second mobile network of the roaming MNO, the second security credential signed by the home MNO; or a third security credential of the roaming MNO from a certificate authority common to the home MNO and the roaming MNO; or a combination thereof.

In some examples, the apparatus may include means for determining a network supports receipt of a secured query message. In some examples, the determining may be based at least in part on a network advertisement. In some examples, the apparatus may include means for receiving a non-secured message from the network, and the secured query message may be generated in response to the non-secured message. In some examples, the secured query message may be further generated based at least in part on a network security credential of the network. In some examples, the secured query message may be secured based at least in part on pairing-based cryptography. In some examples, the pairing-based cryptography may include at least one of: an identity-based encryption, an identity-based signature, or a combination thereof. In some examples, the apparatus may include means for determining the response is associated with the security credential of the wireless communication device and a network security credential of the network, and means for determining whether to perform the AKA with the network based at least in part on the response. In some examples, the apparatus may include means for determining the response is not associated with: the security credential of the wireless communication device, a network security credential of the network, or a combination thereof; and means for refraining from considering the response when determining whether to perform the AKA with the network. In some examples, the secured query message may include: an access request, a network capability query, a service query, or a combination thereof. In some examples, the response may include a message that causes the wireless communication device a denial of service.

In one example, another apparatus for wireless communication at a wireless communication device is described. The apparatus may include a processor, and memory in electronic communication with the processor. The processor and the memory may be configured to generate a secured query message based at least in part on a security credential of the wireless communication device. The secured query message may be generated prior to performing an AKA with a network. The processor and the memory may be further configured to transmit the secured query message to the network; to receive a response to the secured query message; and to determine whether to perform the AKA with the network based at least in part on the received response.

In some examples of the apparatus, the processor and the memory may be configured to establish a secure connection with the network based at least in part on the security credential of the wireless communication device and a network security credential of the network, and the secured query message may be transmitted to the network using the secure connection. In some examples, establishing the secure connection may include establishing the secure connection with a core network. In some examples, establishing the secure connection may include performing a TLS handshake over a NAS. In some examples, establishing the secure connection may include establishing the secure connection with a network access device. In some examples, establishing the secure connection may include performing a TLS handshake over a RRC connection. In some examples, the processor and the memory may be configured to perform the AKA using the secure connection. In some examples, the wireless communication device may be associated with a first mobile network of a home MNO, and the processor and the memory may be configured to obtain at least one of: a first security credential of a roaming MNO from the first mobile network; or a second security credential of the roaming MNO from a second mobile network of the roaming MNO, the second security credential signed by the home MNO; or a third security credential of the roaming MNO from a certificate authority common to the home MNO and the roaming MNO; or a combination thereof.

In some examples of the apparatus, the processor and the memory may be configured to determine a network supports receipt of a secured query message. In some examples, the determining may be based at least in part on a network advertisement. In some examples, the processor and the memory may be configured to receive a non-secured message from the network, and the secured query message may be generated in response to the non-secured message. In some examples, the secured query message may be further generated based at least in part on a network security credential of the network. In some examples, the secured query message may be secured based at least in part on pairing-based cryptography. In some examples, the pairing-based cryptography may include at least one of: an identity-based encryption, an identity-based signature, or a combination thereof. In some examples, the processor and the memory may be configured to determine the response is associated with the security credential of the wireless communication device and a network security credential of the network, and to determine whether to perform the AKA with the network based at least in part on the response. In some examples, the processor and the memory may be configured to determine the response is not associated with: the security credential of the wireless communication device, a network security credential of the network, or a combination thereof; and refraining from considering the response when determining whether to perform the AKA with the network. In some examples, the secured query message may include: an access request, a network capability query, a service query, or a combination thereof. In some examples, the response may include a message that causes the wireless communication device a denial of service.

In one example, a non-transitory computer-readable medium storing computer-executable code for wireless communication at a wireless communication device is described. The code may be executable by a processor to generate a secured query message based at least in part on a security credential of the wireless communication device. The secured query message may be generated prior to performing an AKA with a network. The code may be further executable by the processor to transmit the secured query message to the network; to receive a response to the secured query message; and to determine whether to perform the AKA with the network based at least in part on the received response.

In some examples of the non-transitory computer-readable medium, the code may be executable by the processor to establish a secure connection with the network based at least in part on the security credential of the wireless communication device and a network security credential of the network, and the secured query message may be transmitted to the network using the secure connection. In some examples, the code executable by the processor to establish the secure connection may include code executable by the processor to establish the secure connection with a core network. In some examples, the code executable by the processor to establish the secure connection may include code executable by the processor to perform a TLS handshake over a NAS. In some examples, the code executable by the processor to establish the secure connection may include code executable by the processor to establish the secure connection with a network access device. In some examples, the code executable by the processor to establish the secure connection may include code executable by the processor to perform a TLS handshake over a RRC connection. In some examples, the code may be executable by the processor to perform the AKA using the secure connection. In some examples, the wireless communication device may be associated with a first mobile network of a home MNO, and the code may be executable by the processor to obtain at least one of: a first security credential of a roaming MNO from the first mobile network; or a second security credential of the roaming MNO from a second mobile network of the roaming MNO, the second security credential signed by the home MNO; or a third security credential of the roaming MNO from a certificate authority common to the home MNO and the roaming MNO; or a combination thereof.

In some examples of the non-transitory computer-readable medium, the code may be executable by the processor to determine a network supports receipt of a secured query message. In some examples, the determining may be based at least in part on a network advertisement. In some examples, the code may be executable by the processor to receive a non-secured message from the network, and the secured query message may be generated in response to the non-secured message. In some examples, the secured query message may be further generated based at least in part on a network security credential of the network. In some examples, the secured query message may be secured based at least in part on pairing-based cryptography. In some examples, the pairing-based cryptography may include at least one of: an identity-based encryption, an identity-based signature, or a combination thereof. In some examples, the code may be executable by the processor to determine the response is associated with the security credential of the wireless communication device and a network security credential of the network, and to determine whether to perform the AKA with the network based at least in part on the response. In some examples, the code may be executable by the processor to determine the response is not associated with: the security credential of the wireless communication device, a network security credential of the network, or a combination thereof; and refraining from considering the response when determining whether to perform the AKA with the network. In some examples, the secured query message may include: an access request, a network capability query, a service query, or a combination thereof. In some examples, the response may include a message that causes the wireless communication device a denial of service.

In one example, a method for wireless communication at a network device is described. The method may include receiving a secured query message over a network, from a wireless communication device, prior to performing an AKA with the wireless communication device. The secured query message may be based at least in part on a security credential of the wireless communication device. The method may also include generating, in response to receiving the secured query message, a secured response message based at least in part on a network security credential of the network device; and transmitting the secured response message to the wireless communication device.

In some examples, the method may include establishing a secure connection with the wireless communication device based at least in part on the security credential of the wireless communication device and the network security credential of the network device, and the secured query message may be received over the network using the secure connection. In some examples, the network device may include at least one of: a network access device, a core network device, or a combination thereof. In some examples, the secure connection may include a TLS handshake over a NAS. In some examples, the secure connection may include a TLS handshake over a RRC connection. In some examples, the method may include performing the AKA with the wireless communication device using the secure connection. In some examples, the wireless communication device and the network device may be associated with a first mobile network of a home MNO, and the method may include transmitting to the wireless communication device, over the first mobile network, a security credential of a roaming MNO.

In some examples of the method, the secured query message may be further based at least in part on the network security credential of the network device. In some examples, the secured query message may be secured based at least in part on pairing-based cryptography. In some examples, the secured query message may include: an access request, a network capability query, a service query, or a combination thereof. In some examples, the secured response message may include a message that causes the wireless communication device a denial of service.

In one example, an apparatus for wireless communication at a network device is described. The apparatus may include means for receiving a secured query message over a network, from a wireless communication device, prior to performing an AKA with the wireless communication device. The secured query message may be based at least in part on a security credential of the wireless communication device. The apparatus may also include means for generating, in response to receiving the secured query message, a secured response message based at least in part on a network security credential of the network device; and means for transmitting the secured response message to the wireless communication device.

In some examples, the apparatus may include means for establishing a secure connection with the wireless communication device based at least in part on the security credential of the wireless communication device and the network security credential of the network device, and the secured query message may be received over the network using the secure connection. In some examples, the network device may include at least one of: a network access device, a core network device, or a combination thereof. In some examples, the secure connection may include a TLS handshake over a NAS. In some examples, the secure connection may include a TLS handshake over a RRC connection. In some examples, the apparatus may include means for performing the AKA with the wireless communication device using the secure connection. In some examples, the wireless communication device and the network device may be associated with a first mobile network of a home MNO, and the apparatus may include means for transmitting to the wireless communication device, over the first mobile network, a security credential of a roaming MNO.

In some examples of the apparatus, the secured query message may be further based at least in part on the network security credential of the network device. In some examples, the secured query message may be secured based at least in part on pairing-based cryptography. In some examples, the secured query message may include: an access request, a network capability query, a service query, or a combination thereof. In some examples, the secured response message may include a message that causes the wireless communication device a denial of service.

In one example, another apparatus for wireless communication at a network device is described. The apparatus may include a processor, and memory in electronic communication with the processor. The processor and the memory may be configured to receive a secured query message over a network, from a wireless communication device, prior to performing an AKA with the wireless communication device. The secured query message may be based at least in part on a security credential of the wireless communication device. The processor and the memory may also be configured to generate, in response to receiving the secured query message, a secured response message based at least in part on a network security credential of the network device; and to transmit the secured response message to the wireless communication device.

In some examples of the apparatus, the processor and the memory may be configured to establish a secure connection with the wireless communication device based at least in part on the security credential of the wireless communication device and the network security credential of the network device, and the secured query message may be received over the network using the secure connection. In some examples, the network device may include at least one of: a network access device, a core network device, or a combination thereof. In some examples, the secure connection may include a TLS handshake over a NAS. In some examples, the secure connection may include a TLS handshake over a RRC connection. In some examples, the processor and the memory may be configured to perform the AKA with the wireless communication device using the secure connection. In some examples, the wireless communication device and the network device may be associated with a first mobile network of a home MNO, and the processor and the memory may be configured to transmit to the wireless communication device, over the first mobile network, a security credential of a roaming MNO.

In some examples of the apparatus, the secured query message may be further based at least in part on the network security credential of the network device. In some examples, the secured query message may be secured based at least in part on pairing-based cryptography. In some examples, the secured query message may include: an access request, a network capability query, a service query, or a combination thereof. In some examples, the secured response message may include a message that causes the wireless communication device a denial of service.

In one example, a non-transitory computer-readable medium storing computer-executable code for wireless communication at a network device is described. The code may be executable by a processor to receive a secured query message over a network, from a wireless communication device, prior to performing an AKA with the wireless communication device. The secured query message may be based at least in part on a security credential of the wireless communication device. The code may also be executable by the processor to generate, in response to receiving the secured query message, a secured response message based at least in part on a network security credential of the network device; and to transmit the secured response message to the wireless communication device.

In some examples of the non-transitory computer-readable medium, the code may be executable by the processor to establish a secure connection with the wireless communication device based at least in part on the security credential of the wireless communication device and the network security credential of the network device, and the secured query message may be received over the network using the secure connection. In some examples, the network device may include at least one of: a network access device, a core network device, or a combination thereof. In some examples, the secure connection may include a TLS handshake over a NAS. In some examples, the secure connection may include a TLS handshake over a RRC connection. In some examples, the code may be executable by the processor to perform the AKA with the wireless communication device using the secure connection. In some examples, the wireless communication device and the network device may be associated with a first mobile network of a home MNO, and the code may be executable by the processor to transmit to the wireless communication device, over the first mobile network, a security credential of a roaming MNO.

In some examples of the non-transitory computer-readable medium, the secured query message may be further based at least in part on the network security credential of the network device. In some examples, the secured query message may be secured based at least in part on pairing-based cryptography. In some examples, the secured query message may include: an access request, a network capability query, a service query, or a combination thereof. In some examples, the secured response message may include a message that causes the wireless communication device a denial of service.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present techniques may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The present disclosure describes techniques for transmitting or receiving secure signaling before performing an AKA. Pre-AKA secure signaling may be achieved, for example, by establishing a secure connection between a UE and a network device prior to the signaling, or by authenticating messages based on UE or network device security credentials. The network device may include a network access device (e.g., a radio head, base station, eNB, or ANC) or a central node of a core network (e.g., a MME). In some examples, the types of messages that may be secured pre-AKA using the techniques described in the present disclosure include previously unprotected NAS messages, such as Attach Request messages, TAU Request messages, Service Request messages, Network Capability Queries, Service Queries, Attach Reject messages, TAU Reject messages, Service Reject messages, Detach Request messages, responses to these messages, etc.

By transmitting secured signaling messages, the likelihood that an attacker may intercept a message and provide an inappropriate response may be mitigated. In some examples, an inappropriate response to an Attach Request message may cause a UE a denial of service. For example, an attacker may intercept an Attach Request message transmitted by a UE and respond to the UE with an Attach Reject message to the UE. Alternatively, an attacker may intercept a Network Capability Query message transmitted by a UE and response to the UE with a message indicating that a network does not have capabilities when, in fact, the network does have such capabilities. Similarly, an attacker may intercept a message transmitted to a UE and respond, for example, with a message that misconstrues the UE's capabilities or indicates that the UE has detached from the network when the UE has not detached from the network. In some examples, an attacker's inappropriate response to an unsecured NAS message may cause a UE a denial of service that lasts minutes, hours, or longer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various aspects may be added, omitted, or combined. Also, features described with respect to some examples may be combined in some other examples.

Figure 1:
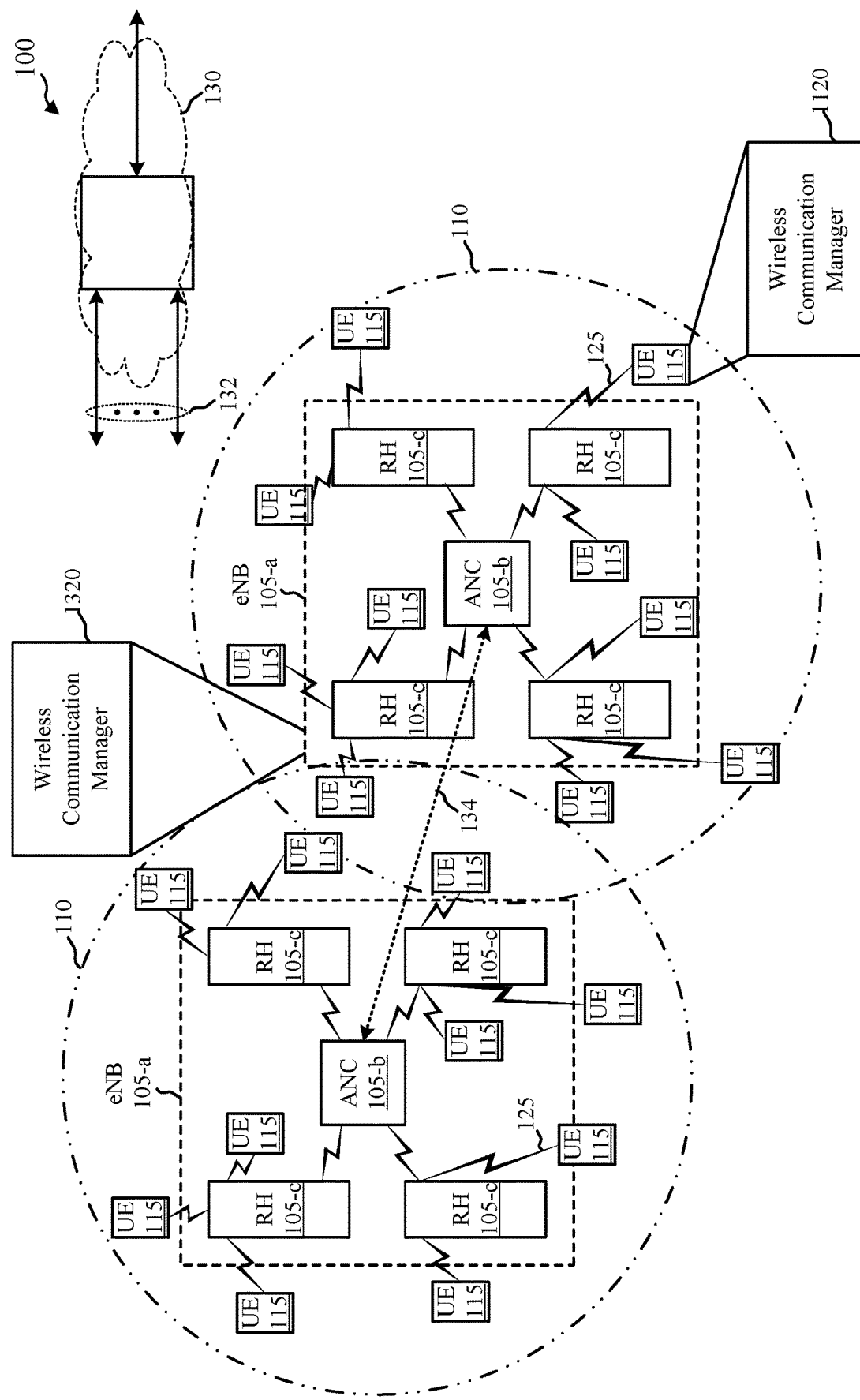
FIG. 1 shows an example of a wireless communication system, in accordance with one or more aspects of the present disclosure.

FIG. 1 shows an example of a wireless communication system 100, in accordance with one or more aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (radio heads (RHs)) 105-c. In an alternative configuration of the wireless communication system 100, the functionality of an ANC 105-b may be provided by a radio head 105-c or distributed across the radio heads 105-c of an eNB 105-a. In another alternative configuration of the wireless communication system 100, the radio heads 105-c may be replaced with base stations, and the ANCs 105- may be replaced by base station controllers (or links to the core network 130). The wireless communication system 100 may also include a mix of radio heads 105-c, base stations, and/or other network access devices 105 for receiving/transmitting communications according to different RATs (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of eNBs 105-a, radio heads 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

One or more of the UEs 115 may include a wireless communication manager 1120. In some examples, the wireless communication manager 1120 may be an example of the wireless communication manager 1120 described with reference to FIG. 11, 12, or 15, and may be used to generate a secured query message based at least in part on a security credential of a UE 115, where the secured query message is generated prior to performing an AKA with a network (e.g., with a network access device 105, or with a central node (e.g., an MME) of the core network 130); to transmit the secured query message to the network; to receive a response to the secured query message; and to determine whether to perform the AKA with the network based at least in part on the received response.

One or more network devices (e.g., one or more of the radio heads 105-c, base stations, eNBs 105-a, or ANCs 105-b, or a central node (e.g., an MME) of the core network 130) may include a wireless communication manager 1320. In some examples, the wireless communication manager 1320 may be an example of the wireless communication manager 1320 described with reference to FIG. 13, 14, 16, or 17, and may be used to receive a secured query message over a network, from a wireless communication device (e.g., a UE 115), prior to performing an AKA with the wireless communication device. The secured query message may be based at least in part on a security credential of the wireless communication device. The wireless communication manager 1320 may also be used to generate, in response to receiving the secured query message, a secured response message based at least in part on a network security credential of the network device; and to transmit the secured response message to the wireless communication device.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, the radio heads 105-c and/or UEs 115 may include multiple antennas for employing antenna diversity schemes to improve communication quality and reliability between radio heads 105-c and UEs 115. Additionally or alternatively, radio heads 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
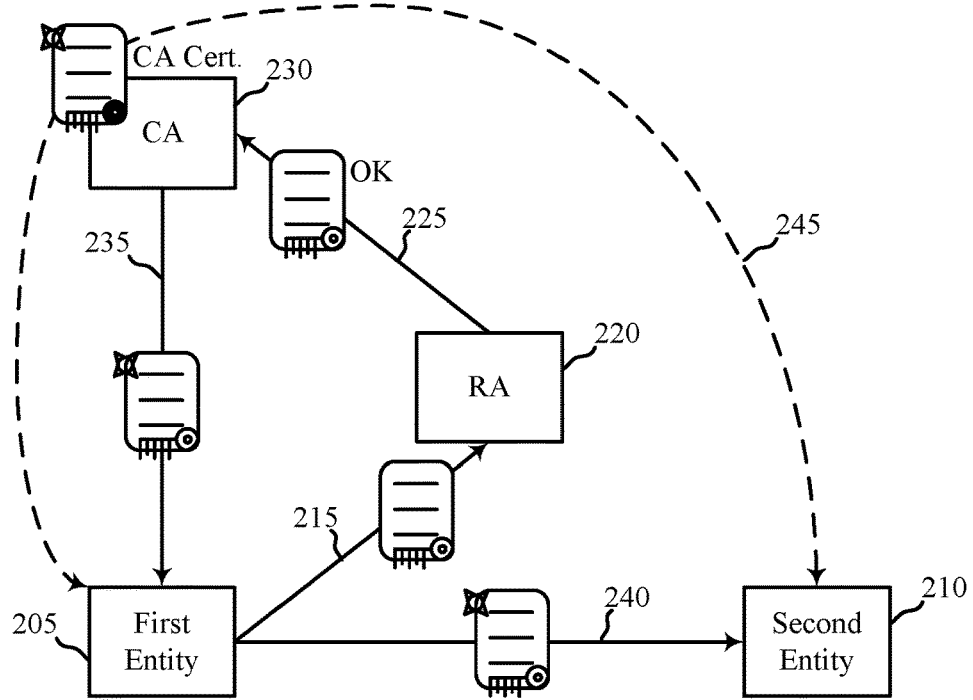
FIG. 2 shows an example of public key-based cryptography, in accordance with one or more aspects of the present disclosure.

FIG. 2 shows an example of a public key-based cryptosystem architecture 200, in accordance with one or more aspects of the present disclosure. The public key-based cryptosystem architecture 200 may be employed by a UE communicating with a network (or vice versa). In some examples, the UE may be an example of aspects of one or more of the UEs 115 described with reference to FIG. 1, and the network may include one or more of the network access devices 105 described with reference to FIG. 1 or one or more central nodes in the core network 130 described with reference to FIG. 1. In some embodiments, a UE may be referred to as a "client device."

In FIG. 2, a first entity 205 (e.g., a network device) may transmit a secure message over a network, to a second entity 210 (e.g., a UE) based on the public key-based cryptography. Prior to transmitting the secure message, the first entity 205 may generate a public/private key pair. In some examples, the first entity 205 may generate a private key (s) and a public key (sP or $P^s$), in which P is a public parameter. In one example, sP may be used as a public key for an elliptic curve cryptography, whereas $P^s$ may be used for a finite field cryptography. The public key may be shared with others. The private key may be maintained as a secret of the first entity 205.

At 215, the first entity 205 may transmit its public key to a registration authority (RA) 220. The RA 220 may authenticate the first entity 205 and, at 225, transmit a request for a digital certificate of the first entity 205 to a certificate authority (CA) 230. The request transmitted at 225 may include the public key of the first entity 205. The CA may serve as a "root of trust" for entities of a network (where "entities" may include a network device in the network, a user device that is accessing the network, of a combination thereof), and may issue a digital certificate of the first entity 205 (e.g., a certificate in which the CA signs the public key of the first entity 205 using a private key of the CA 230). At 235, the CA 230 may transmit the digital certificate of the first entity 205 to the first entity 205.

At 240, the first entity 205 may transmit a secure message to the second entity 210. The secure message may be a communication signed with a digital signature based on the digital certificate of the first entity 205. Upon receiving the secure message, the second entity 210 may communicate with the CA 230, at 245, to verify the digital certificate of the first entity 205. If the second entity can verify the communication by way of authenticating the digital signature, then the UE may continue with the communications.

In other examples, if the UE cannot verify the communication (e.g., there is not digital signature associated with the transmission), the UE may take any of a plurality of actions. In one example, the UE may transmit a re-request after the expiration of a pre-determined time (e.g., an exponential back-off after each failed attempt). In another example, the UE may transmit a re-request using a different cell. In yet another example, the UE may transmit a re-request after moving a pre-determined distance away from the current cell, or may transmit a re-request after making a Tracking Area change.

Similarly to how the first entity 205 generated a public/private key pair and obtained a digital certificate from the CA 230, the second entity 210 may similarly generate a public/private key pair and obtain its own digital certificate from the CA 230.

In some examples, public key-based cryptography such as the public key-based cryptosystem architecture 200 described with reference to FIG. 2 may be used by a mobile network operator (MNO) to provide security for pre-AKA messages transmitted by UEs and network devices. In some examples, a node (e.g., a central node) of the MNO may generate a public/private key (PK-SK) pair. The MNO may obtain a digital certificate corresponding to its public key from a trusted CA or may generate a self-certified digital certificate for its public key. In either case, the MNO may provision the digital certificate corresponding to its public key to network devices under the MNO's control (e.g., customer premises equipment (CPE) such as a mobility management entity (MME); user-facing provider edge (UPE) equipment, such as a packet gateway (P-GW); or network access devices such as radio heads, base stations, eNBs, or ANCs). Alternatively, the MNO may cause or allow a network device to generate its own public/private key pair, or may provision a public/private key pair to a network device. The MNO may also provision the digital certificate corresponding to its public key, or digital certificates corresponding to public keys of network devices within the MNO, to subscriber equipment (e.g., UEs) associated with the MNO. In some examples, the digital certificate(s) of the MNO and/or its network devices may be provided to a subscriber device as part of a subscription enrollment process for the subscriber device (e.g., via an access management server).

A client device may also generate a public/private key pair, and may obtain a digital certificate corresponding to its public key from the MNO.

Figure 3:
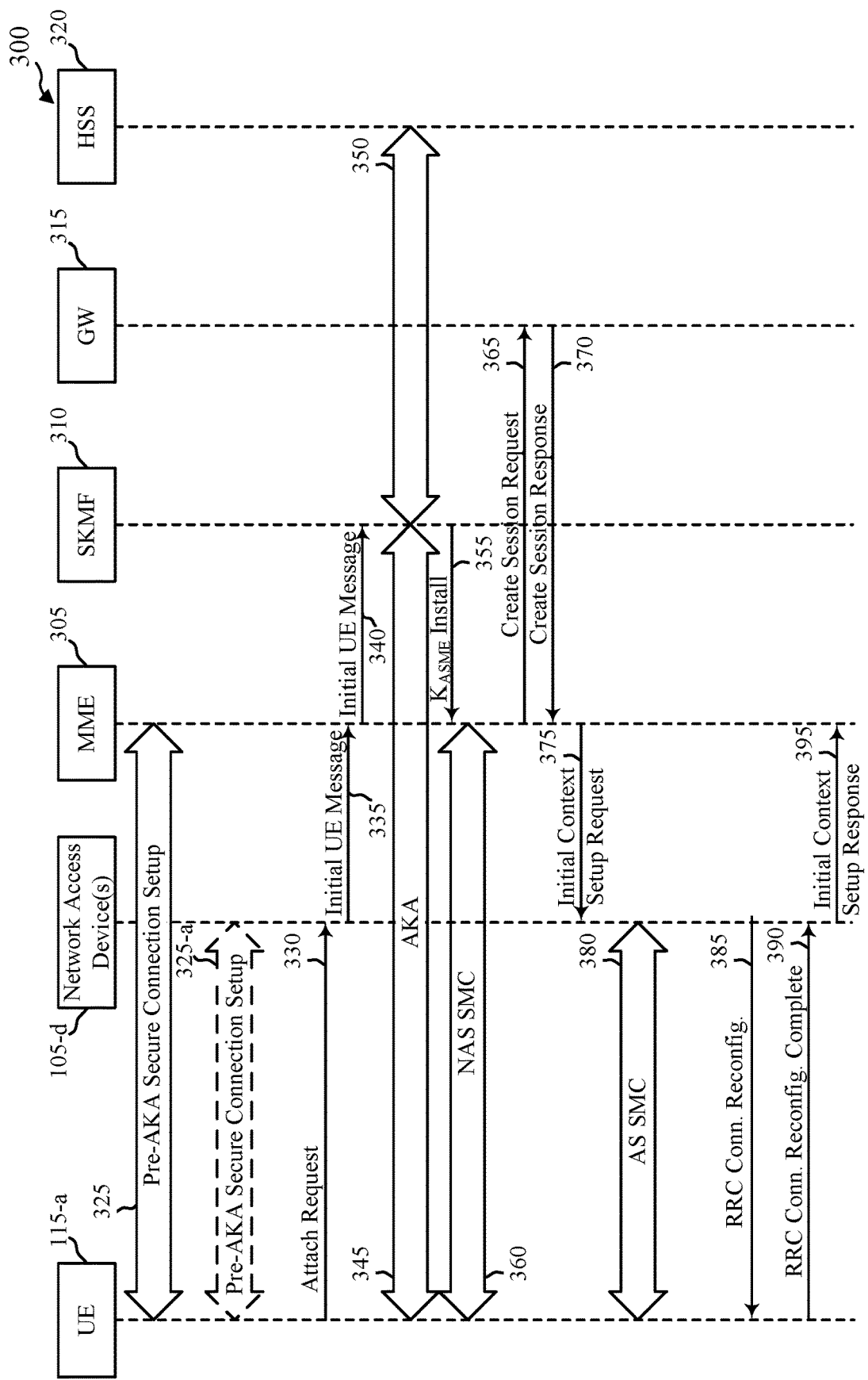
FIG. 3 shows a communication flow in which communication occurs between a UE, at least one network access device, a MME, a secure key management facility (SKMF), a gateway (GW), and a home subscriber server (HSS) in accordance with one or more aspects of the present disclosure.

FIG. 3 shows a communication flow 300 in which communication occurs between a UE 115-a, at least one network access device 105-d (e.g., a radio head, base station, eNB, and/or ANC), a MME 305, a secure key management facility (SKMF) 310, a gateway (GW) 315, and a home subscriber server (HSS) 320 in accordance with one or more aspects of the present disclosure. In some examples, the MME may be a 4G entity and the term "MME" or "mobility management entity" may be used in context with 4G technology. With respect to 5G technology, the terms used may be "mobility management function" ("MMF") and "session management function" ("SMF"). In the 4G context, MME may be split into two functions: MMF and SMF. The UE 115-a may be an example of aspects of the UEs 115 described with reference to FIG. 1, and the network access device 105-d may be an example of aspects of the network access devices 105 described with reference to FIG. 1.

At 325, the UE 115-a and MME 305 (a first network device) may setup a pre-authentication and key agreement (pre-AKA) secure connection. Alternatively, the MME 305 may delegate setup of the pre-AKA secure connection to a network access device (a second network device), and the UE 115-a and network access device 105-d may setup the pre-AKA secure connection at 325-a. In some examples, the MME 305 may delegate setup of the pre-AKA secure connection to the network access device 105-d because the MME 305 has a heavy processing load and the MME 305 has a trusted relationship with the network access device 105-d. In some examples, the pre-AKA secure connection setup at 325 or 325-a may be based on a handshake (e.g., a transport layer security (TLS) handshake). The pre-AKA secure connection may be based on one or more end-entity digital certificates. When the pre-AKA secure connection is setup between the UE 115-a and MME 305, and in some examples, establishing the secure connection may include performing a TLS handshake over a NAS. When the pre-AKA secure connection is setup between the UE 115-a and the network access device 105-d, and in some examples, establishing the secure connection may include performing a TLS handshake over a RRC connection.

Following setup of the pre-AKA secure connection at 325 or 325-a, the UE 115-a may transmit a non-access stratum (NAS) message, such as an Attach Request message 330, to the network (e.g., to the network access device 105-d). The NAS message may be transmitted using the pre-AKA secure connection. At 335, the network access device 105-d may transmit an initial UE message to the MME 305, which in turn may transmit the initial UE message to the SKMF 310 at 340. At 345, the UE 115-a and network (e.g., the SKMF 310) may perform an AKA. While performing the AKA, the SKMF 310 may communicate with the HSS 320 at 350. As part of performing the AKA, and at 355, the SKMF 310 may install a key, $K_{ASME}$, at the MME 305, and at 360, the MME 305 may transmit a NAS security mode command (SMC) to the UE 115-a, and NAS security may configured for the UE 115-a. At 365, the MME 305 may transmit a Create Session Request message to the GW 315; and at 370, the GW 315 may return a Create Session Response message to the MME 305. The MME 305 may then transmit an Initial Context Setup Request to the network access device 105-d at 375.

At 380, the network access device 105-d may transmit an access stratum (AS) SMC to the UE 115-a, and AS security may be configured for the UE 115-a. As part of the AS security configuration, and at 385, the network access device 105-d may transmit an RRC Connection Reconfiguration message to the UE 115-a. At 390, the UE 115-a may transmit an RRC Connection Reconfiguration Complete message to the network access device 105-d. At 395, the network access device 105-d may transmit an Initial Context Setup Response to the MME 305.

Under some conditions, the network may reject the UE's Attach Request message 330, or otherwise cause the UE 115-a a denial of service. For example, instead of performing the AKA at 345, the MME 305 or network access device 105-d may transmit, to the UE 115-a, an Attach Reject message. An Attach Reject message may cause the UE 115-a a denial of service, and in an LTE/LTE-A or 4G environment, an Attach Reject message may cause the UE 115-a to consider a Universal Subscriber Identity Module (USIM) of the UE 115-a invalid for both Evolved Packet System (EPS) services and non-EPS services until the UE 115-a power cycles, or until a Universal Integrated Circuit Card (UICC) containing the USIM is removed (and reinserted or replaced). In some examples, an Attach Reject message may be sent to the UE 115-a by an attacker, yet be considered valid (i.e., sent by the network) by the UE 115-a because the Attach Reject message cannot be verified. In some examples, a message that may cause the UE 115-a a denial of service, or other pre-AKA messages transmitted by the network to the UE 115-a, may be transmitted using the pre-AKA secure connection 325 or 325-a. In this manner, the UE 115-a may distinguish valid responses, transmitted by a network device, from invalid responses transmitted by an attacker.

In some examples, the UE 115-a may transmit another message prior to, or instead of, the Attach Request message 330. For example, the UE 115-a may transmit a Tracking Area Update (TAU) Request message, Service Request message, a Network Capability Query, a Service Query, etc. In some examples, a network device may respond with a message that causes the UE 115-a a denial of service, such as a TAU Reject message, or a Service Reject message. A network device may also respond with a message that indicates the network cannot provide a service or capability desired by the UE 115-a. In some examples, the network may transmit (and may initiate transmission of) a Detach Request message to the UE 115-a. Any or all of these messages (transmitted by the UE 115-a or the network) may be transmitted using the pre-AKA secure connection 325 or 325-a. Secured transmissions of these types of messages can mitigate the likelihood that the UE 115-a or network receives and acts on an attacker's message. As already mentioned, non-secured pre-AKA message transmissions can leave the UE 115-a vulnerable to a non-network initiated denial of service. Non-secured pre-AKA message transmissions can also leave the UE 115-a vulnerable to sub-par service delivery. For example, an attacker may respond to a Service Query transmitted by the UE 115-a with a message indicating that the network is capable of fewer services than it is actually capable of providing, or an attacker may transmit a message to the network indicating that the UE 115-d is capable of fewer services than it is actually capable of supporting.

Figure 4:
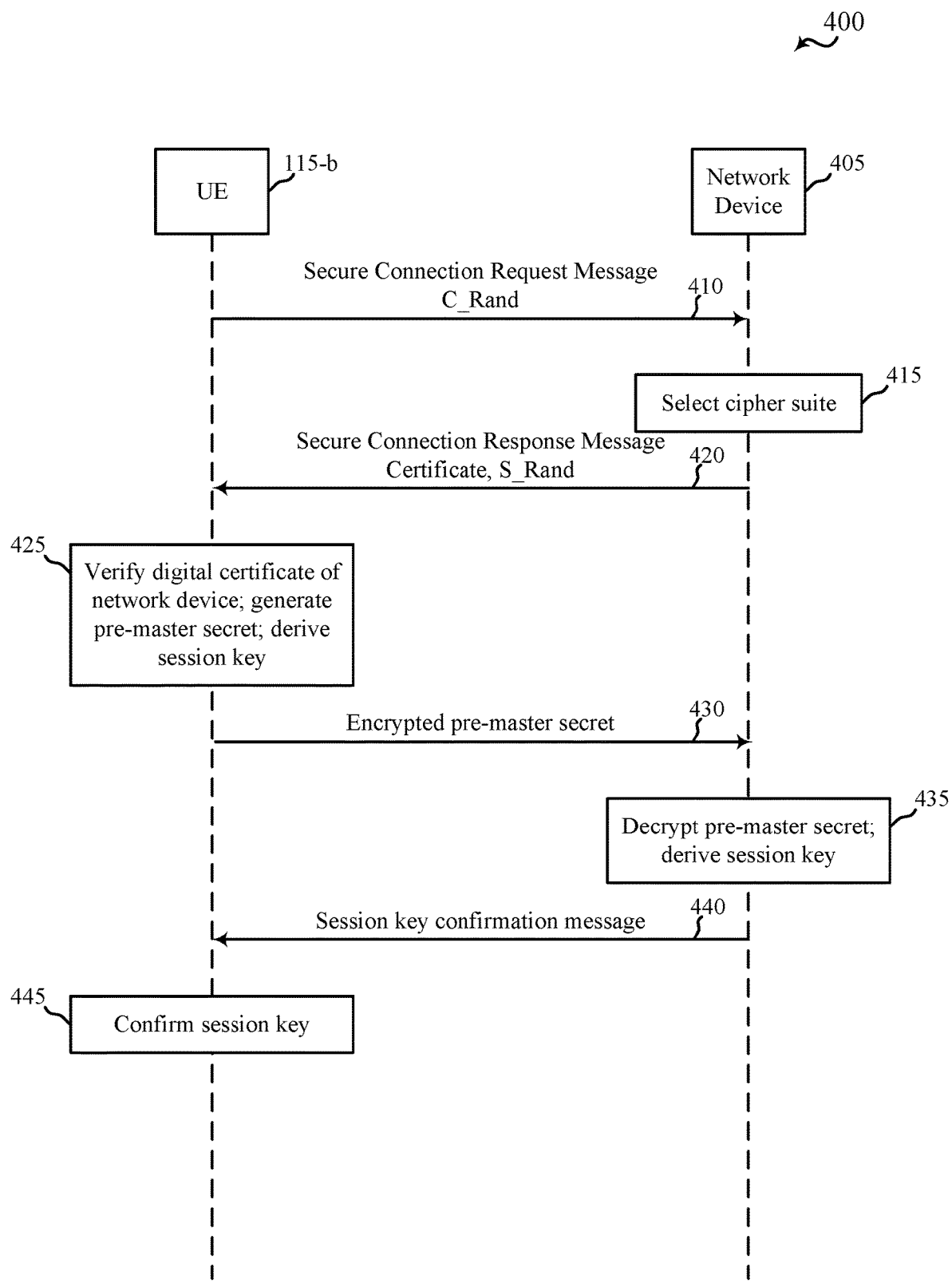
FIG. 4 shows a communication flow in which communication occurs between a UE and a network device, in accordance with one or more aspects of the present disclosure.

FIG. 4 shows a communication flow 400 in which communication occurs between a UE 115-b and a network device 405, in accordance with one or more aspects of the present disclosure. The communication flow 400 may be used, in some examples, to setup the pre-AKA secure connection 325 or 325-a described with reference to FIG. 3. The communication flow 400 may be based on a TLS handshake. The UE 115-b may be an example of aspects of the UEs 115 described with reference to FIG. 1 or 3, and the network device 405 may be an example of aspects of the network access devices 105 (e.g., a radio head, base station, eNB, and/or ANC) described with reference to FIG. 1 or 3, a central node of the core network 130 described with reference to FIG. 1, or the MME 305 described with reference to FIG. 3.

At 410, the UE 115-b may transmit to the network device 405 a secure connection request message including a security credential of the UE 115-b (e.g., a client random number (C_Rand)). In some examples, the secure connection request message may also include an indication of cipher suites supported by the UE 115-b.

At 415, the network device 405 may select a cipher suite for establishing a secure connection with the UE 115-b. The cipher suite may be selected based on an indication of cipher suites received form the UE 115-b, or independently by the network device 405.

At 420, the network device 405 may transmit to the UE 115-b a secure connection response message including a network security credential (e.g., a digital certificate (Certificate) of the network device 405 and a server random number (S_Rand)).

At 425, the UE 115-_b may verify the digital certificate of the network device 405, generate a pre-master secret, and encrypt the pre-master secret based at least in part on a public key of the network device 405. The UE 115-_b may also derive a session key based on the pre-master secret, the client random number, and the server random number.

At 430, the UE 115-b may transmit to the network device 405, a message including the encrypted pre-master secret. Optionally, the message including the encrypted pre-master secret may be authenticated with a digital certificate of the UE 115-b.

At 435, the network device 405 may decrypt the pre-master secret and derive the session key based on the pre-master secret, the client random number, and the server random number. If the message including the encrypted pre-master secret was authenticated with a digital certificate of the UE 115-b, the network device 405 may verify the digital certificate of the UE 115-b.

At 440, the network device 405 may transmit, to the UE 115-b, a message usable by the UE 115-b to confirm that the UE 115-b and the network device 405 derived the same session key. The UE 115-b may confirm that the UE 115-b and the network device 405 derived the same session key at 445.

In the communication flow 400, a digital certificate (e.g., a self-signed or trusted party signed digital certificate) of the network (or MNO) may be provisioned to the UE 115-b before the communication flow 400 begins, and based on the digital certificate, the UE 115-b may verify the digital certificate (or network security credential) as described in FIG. 4.

In some examples of the communication flow 400, the secure connection request message and secure connection response message may be based at least in part on Secure Sockets Layer (SSL) or Transport Layer Security (TLS) messages. Alternatively, an SSL/TLS connection may be established over NAS (e.g., when the network device 405 is a MME) or RRC (e.g., when the network device 405 is a network access device).

Figure 5:
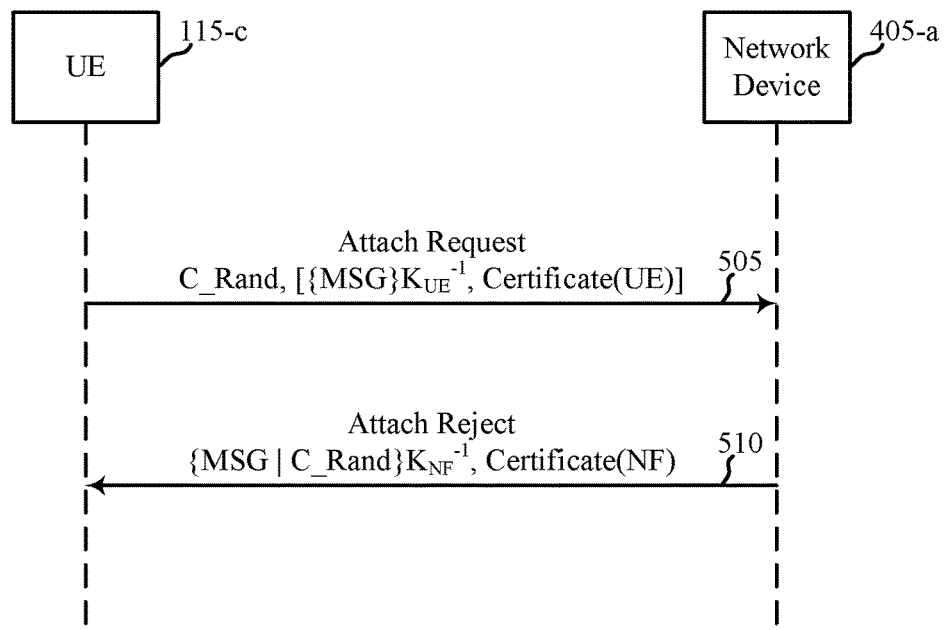
FIG. 5 shows a communication flow in which communication occurs between a UE and a network device, in accordance with one or more aspects of the present disclosure.

FIG. 5 shows a communication flow 500 in which communication occurs between a UE 115-c and a network device 405-a, in accordance with one or more aspects of the present disclosure. The communication flow 500 may be used, in some examples, to authenticate transmission of the Attach Request message 330 described with reference to FIG. 3, without first setting up a secure connection between the UE 115-c and the network device 405-a (e.g., without setting up the pre-AKA secure connection at 325 or 325-a in FIG. 3). The UE 115-c may be an example of aspects of the UEs 115 described with reference to FIG. 1, 3, or 4, and the network device 405-a may be an example of aspects of the network access devices 105 (e.g., a radio head, base station, eNB, and/or ANC) described with reference to FIG. 1 or 3, a central node of the core network 130 described with reference to FIG. 1, the MME 305 described with reference to FIG. 3, or the network device 405 described with reference to FIG. 4.

At 505, the UE 115-c may transmit, to the network device 405-a, an Attach Request message, where the Attach Request message may include a security credential of the UE 115-c (e.g., a client random number (C_Rand)). In some examples, the UE 115-c may sign the entire Attach Request message, including the client random number, using a private key of the UE 115-c (e.g., a secret number chosen by and known only to the first entity 205 and may be represented by $K_{UE}^{-1}$) and send the signed message and a digital certificate of the UE 115-c (Certificate(UE)) to the network device 405.

At 510, the network device 405-a may transmit, to the UE 115-c, an Attach Reject message, where the Attach Request message may include a security credential of the network device 405-a (e.g., a private key of the network device 405-a (e.g., a secret number chosen by and known only to the first entity 205 and may be represented by $K_{NF}^{-1}$)). In some examples, the network device 405-a may sign the Attach Reject message, along with the client random number, with the private key of the network device 405-a. The network device 405-*a* may also provide a digital certificate of the network device 405-*a* (Certificate(NF)) to the UE 115-*c*.

In alternative examples of the communication flow 500, the Attach Request message may alternatively be or include a TAU Request message, Service Request messages, a Network Capability Query, a Service Query, etc. Also, the Attach Reject message may alternatively be or include a TAU Reject message, or a Service Reject message. Alternatively, the communication flow 500 may commence with the network device 405-*a* transmitting a message (e.g., a Detach Request) to the UE 115-*c* (e.g., based on a server random number (S_Rand), the private key of the network device 405-*a*, and/or the digital certificate of the network device 405-*a*), followed by the UE 115-*c* transmitting a message to acknowledge the Detach Request (e.g., based on the server random number, the private key of the UE 115-*c*, and/or the digital certificate of the UE 115-*c*).

When a UE needs to transmit an Attach Request message, TAU Request message, Service Request message, Network Capability Query, Service Query, etc. to a roaming MNO (e.g., an MNO operating as a roaming partner of the UE's home MNO), the UE may need to verify a digital certificate of the roaming MNO. In some examples, the digital certificate of the roaming MNO may be verified using a multi-rooted public key infrastructure (PKI) (e.g., as described with reference to FIG. 6), a hybrid PKI (e.g., as described with reference to FIG. 7), or a bridge CA PKI (e.g., as described with reference to FIG. 8).

Figure 6:
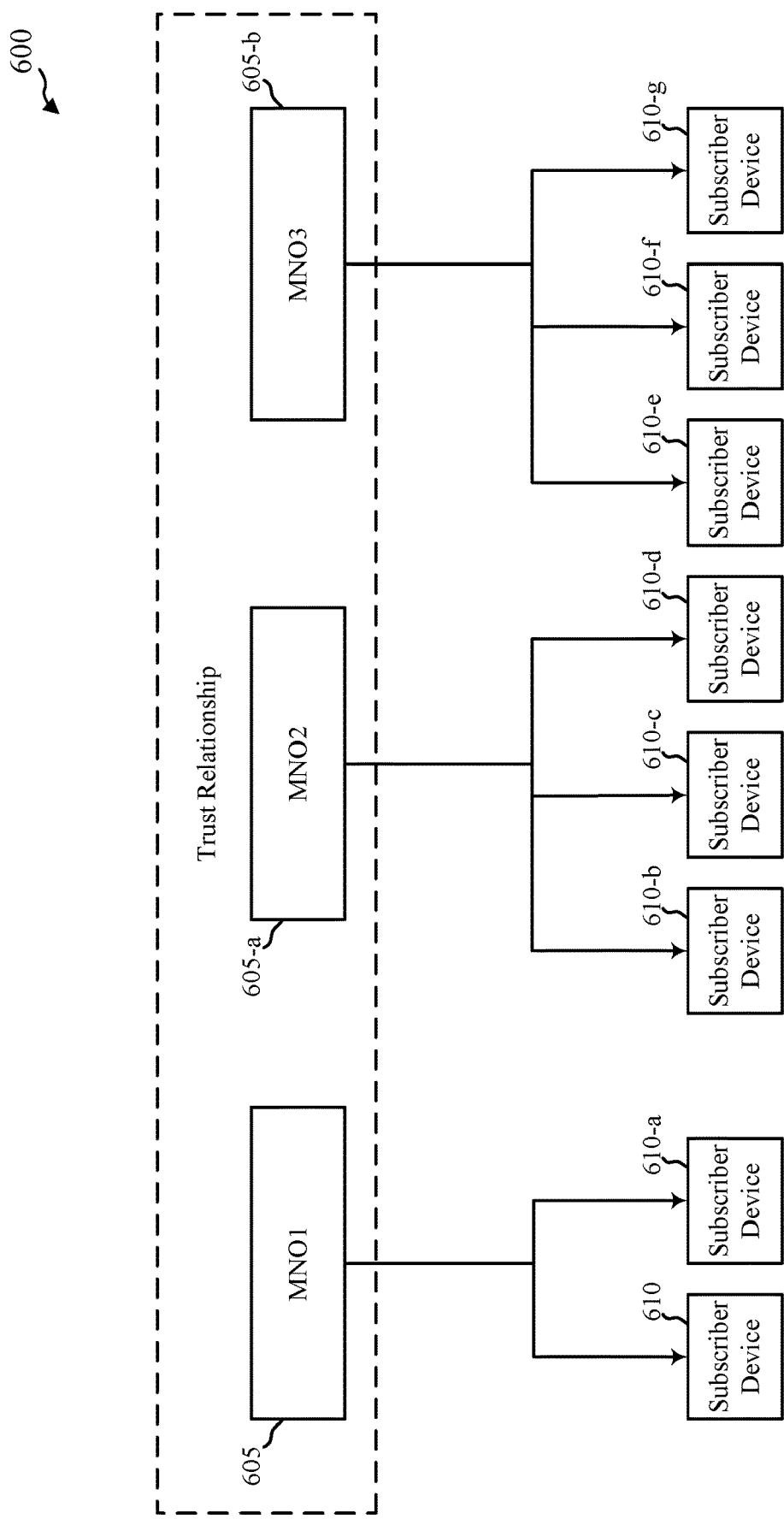
FIG. 6 shows a multi-rooted PKI, in accordance with one or more aspects of the present disclosure.

FIG. 6 shows a multi-rooted PKI 600, in accordance with one or more aspects of the present disclosure. The multi-rooted PKI 600 may include a plurality of MNOs (e.g., a first MNO 605, a second MNO 605-*a*, and a third MNO 605-*b*) that have established a trust relationship. Each of the MNOs may be associated with a number of subscriber devices (e.g., UEs). For example, the first MNO 605 may be associated with a first subscriber device 610 and a second subscriber device 610-*a*; the second MNO 605-*a* may be associated with a third subscriber device 610-*b*, a fourth subscriber device 610-*c*, and a fifth subscriber device 610-*d*; and the third MNO 605-*b* may be associated with a sixth subscriber device 610-*e*, a seventh subscriber device 610-*f*, and an eighth subscriber device 610-*g*.

Because the MNOs have established a trust relationship, each of the MNOs may provide its digital certificate (a security credential) to the other MNOs included in the trust relationship, and each of the MNOs may provide its roaming partners' digital certificates to its subscriber devices. In this manner, a subscriber device may verify the authenticity of a digital certificate of a roaming MNO by having received the digital certificate of the roaming MNO from the home MNO of the subscriber device.

In some examples, the digital certificates of an MNO's roaming partners may be provided to a subscriber device of the MNO through a special interface (e.g., through an access management server of the MNO). A potential advantage of the multi-rooted PKI 600 may be a reduction in over-the-air (OTA) message size overhead. However, a potential disadvantage of the multi-rooted PKI 600 may be an increase in the quantity of data stored by each subscriber device.

Figure 7:
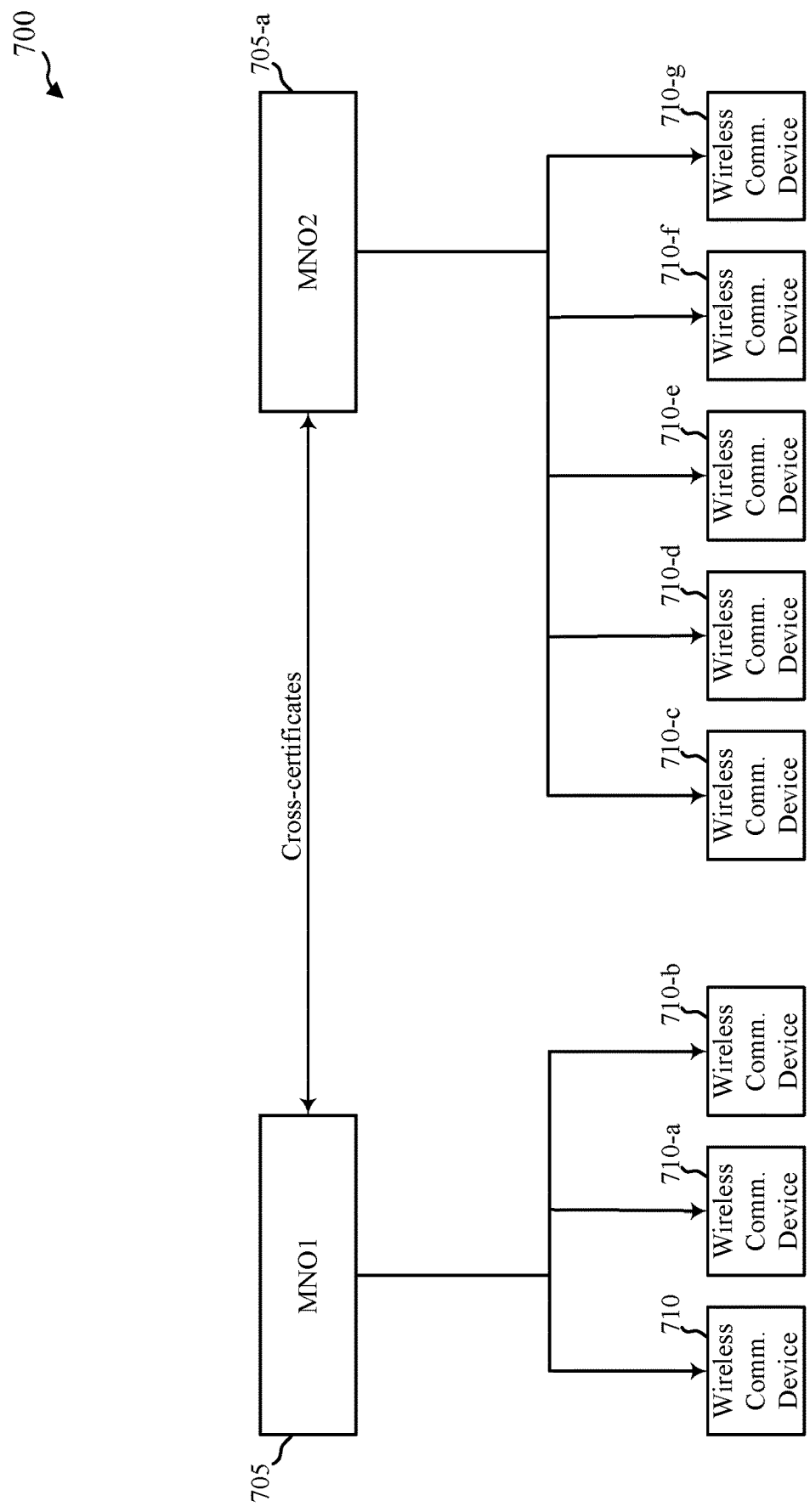
FIG. 7 shows a hybrid PKI, in accordance with one or more aspects of the present disclosure.

FIG. 7 shows a hybrid PKI 700, in accordance with one or more aspects of the present disclosure. The hybrid PKI 700 may include a plurality of MNOs (e.g., a first MNO 705 and a second MNO 705-*a*) that have established a trust relationship. Each of the MNOs may be associated with a number of wireless communication devices (e.g., UEs). For example, the first MNO 705 may be associated with a first wireless communication device 710, a second wireless communication device 710-*a*, and a third wireless communication device 710-*b*; and the second MNO 705-*a* may be associated with a fourth wireless communication device 710-*c*, a fifth wireless communication device 710-*d*, a sixth wireless communication device 710-*e*, a seventh wireless communication device 710-*f*, and an eighth wireless communication device 710-*g*.

Because the MNOs have established a trust relationship, each of the MNOs may sign the digital certificates of other MNOs included in the trust relationship (e.g., as cross-certificates). When a wireless communication device (e.g., the fourth wireless communication device 710-*c*) is a subscriber device of one MNO (e.g., the first MNO 705) and attempts to attach to a network access device of a roaming MNO (e.g., the second MNO 705-*a*), the roaming MNO may transmit, to the wireless communication device, a first digital certificate (e.g., a digital certificate of the roaming MNO) and a second digital certificate (e.g., a digital certificate of the roaming MNO signed by the wireless communication device's home MNO). In this manner, the wireless communication device may verify the authenticity of the digital certificate of the roaming MNO by verifying that its home MNO signed a copy of the digital certificate of the roaming MNO. A potential advantage of the hybrid PKI 700 may be a single root of trust (i.e., a home MNO). However, a potential disadvantage of the hybrid PKI 700 may be increases OTA message sizes (because two digital certificates may need to be transmitted to a wireless communication device that is attempting to attach to an MNO).

Figure 8:
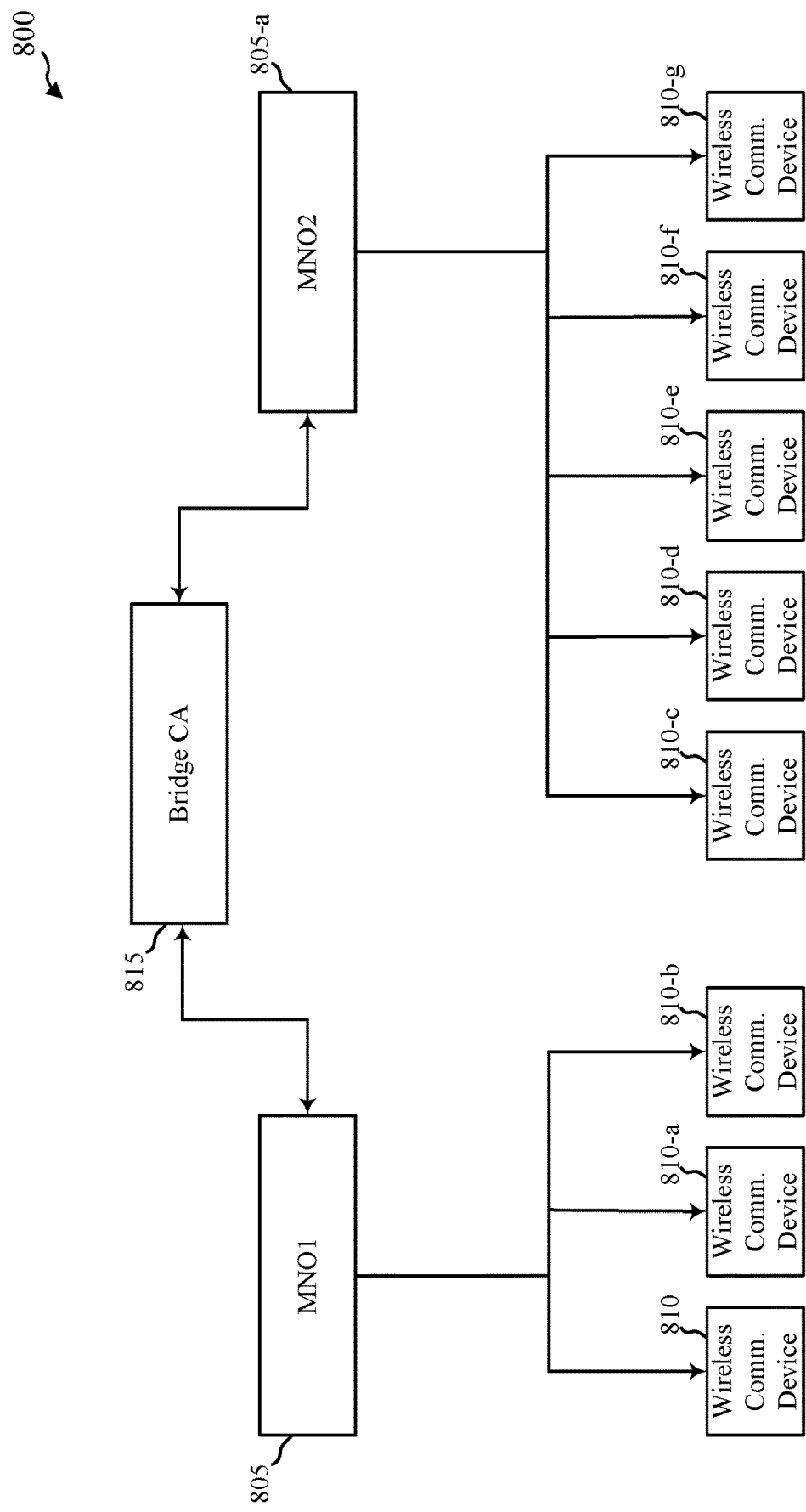
FIG. 8 shows a bridge CA PKI, in accordance with one or more aspects of the present disclosure.

FIG. 8 shows a bridge CA PKI 800, in accordance with one or more aspects of the present disclosure. The bridge CA PKI 800 may include a plurality of MNOs (e.g., a first MNO 805 and a second MNO 805-*a*) that have each established a trust relationship with a bridge CA 815. Each of the MNOs may be associated with a number of wireless communication devices (e.g., UEs). For example, the first MNO 805 may be associated with a first wireless communication device 810, a second wireless communication device 810-*a*, and a third wireless communication device 810-*b*; and the second MNO 805-*a* may be associated with a fourth wireless communication device 810-*c*, a fifth wireless communication device 810-*d*, a sixth wireless communication device 810-*e*, a seventh wireless communication device 810-*f*, and an eighth wireless communication device 810-*g*.

Because each of the MNOs has an established trust relationship with a common bridge CA 815, the home MNO for each wireless communication device may authorize or configure its subscriber devices to trust digital certificates that can be authenticated by the bridge CA 815. In some examples, a home MNO may provision its subscriber devices with a GSMA certificate of the bridge CA 815. Potential advantages of the bridge CA PKI 800 may be a single root of trust (i.e., the bridge CA 815) and reduced OTA message sizes (e.g., because just one digital certificate may need to be transmitted to a wireless communication device that is attempting to attach to an MNO). However, a potential disadvantage of the bridge CA PKI 800 may be a single point of failure (i.e., the bridge CA).

The digital certificate delivery associated with the secure signaling examples described with reference to FIGS. 2-8 can add substantial messaging overhead to the secure signaling. A digital certificate may include, for example, a public key, a fingerprint, a signature, and/or other metadata. For 128-bit security, an RSA public key size and signature size may be 3072 bits each. For 128-bit security, an elliptic curve cryptography (ECC) public key size may be 256 bits, and a signature size may be 512 bits. Even when an MNO uses a self-signed digital certificate, messaging overhead can be substantial. For example, a self-signed RSA digital certificate for RS 2048 may be 0.8 Kilobytes (KB) to 1.0 KB. Further, two digital certificates may be delivered (e.g., an end entity (EE) certificate and an intermediate CA certificate (e.g., when a root CA certificate is preinstalled)).

Figure 9:
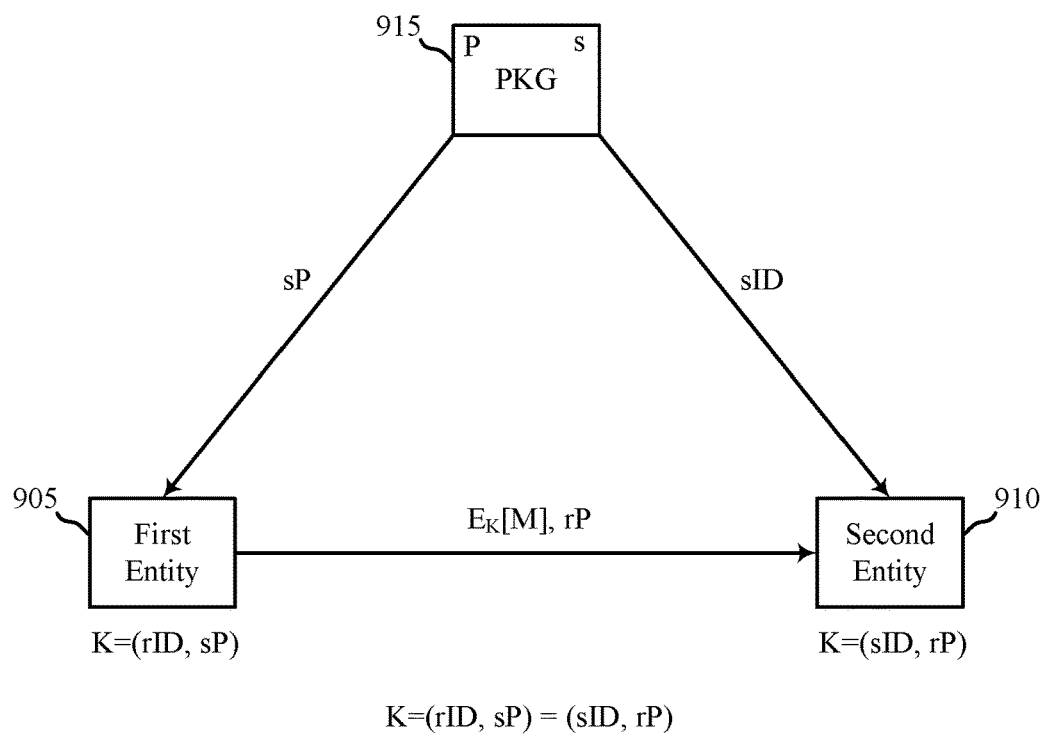
FIG. 9 shows an example of pairing-based cryptography, in accordance with one or more aspects of the present disclosure.

FIG. 9 shows an example of pairing-based cryptography 900, in accordance with one or more aspects of the present disclosure. The pairing-based cryptography 900 may be employed by a UE communicating with a network (or vice versa). In some examples, the UE may be an example of aspects of one or more of the UEs 115 described with reference to FIG. 1, 3, 4, or 5, and the network may include one or more of the network access devices 105 described with reference to FIG. 1, one or more central nodes in the core network 130 described with reference to FIG. 1, the MME 305 described with reference to FIG. 3, or one of the network devices 405 described with reference to FIG. 4 or 5.

In FIG. 9, a first entity 905 (e.g., a UE) may transmit a secure message over a network, to a second entity 910 (e.g., a network device), using pairing-based cryptography (e.g., pairing-based cryptography over Elliptic Curve (e.g., using Weil pairing or Tate pairing)). The pairing-based cryptography may include, for example, an identity-based encryption or an identity-based signature. In some examples, the first entity 905 may, at 920, obtain a public key, sP, from a private key generator (PKG) 915. The PKG 915 may generate the public key, sP, from a private key (s) and a public parameter (P). The private key may be maintained as a secret of the PKG 915. Using the public key, an identifier (ID) of the second entity 910, and a random number (r), the first entity 905 may derive an encryption key (K=(rID, sP)) and encrypt a message (M) based on the encryption key to form the encrypted message: $E_K[M]$, rP. The encrypted message may be transmitted to the second entity 910 at 925. At 930, the second entity 910 may obtain a private key, sID, from the PKG 915. The PKG 915 may generate the private key, sID, from the PKG's private key (s) and the identifier (ID) of the second entity 910. Using the private key (sID) and the parameter rP, the second entity 910 may derive the encryption key (K=(sID, rP)). Because K=(rID, sP)=(sID, rP), the encryption key derived by the second entity 910 may be used to decrypt the encrypted message received form the first entity 905.

A potential advantage of pairing-based cryptography is that PKI is unnecessary and public keys do not need to be transferred between entities. A potential disadvantage of pairing-based cryptography is that the PKG 915 can decrypt any message. However, this may be okay if the PKG 915 is controlled by an MNO that it serves.

Figure 10:
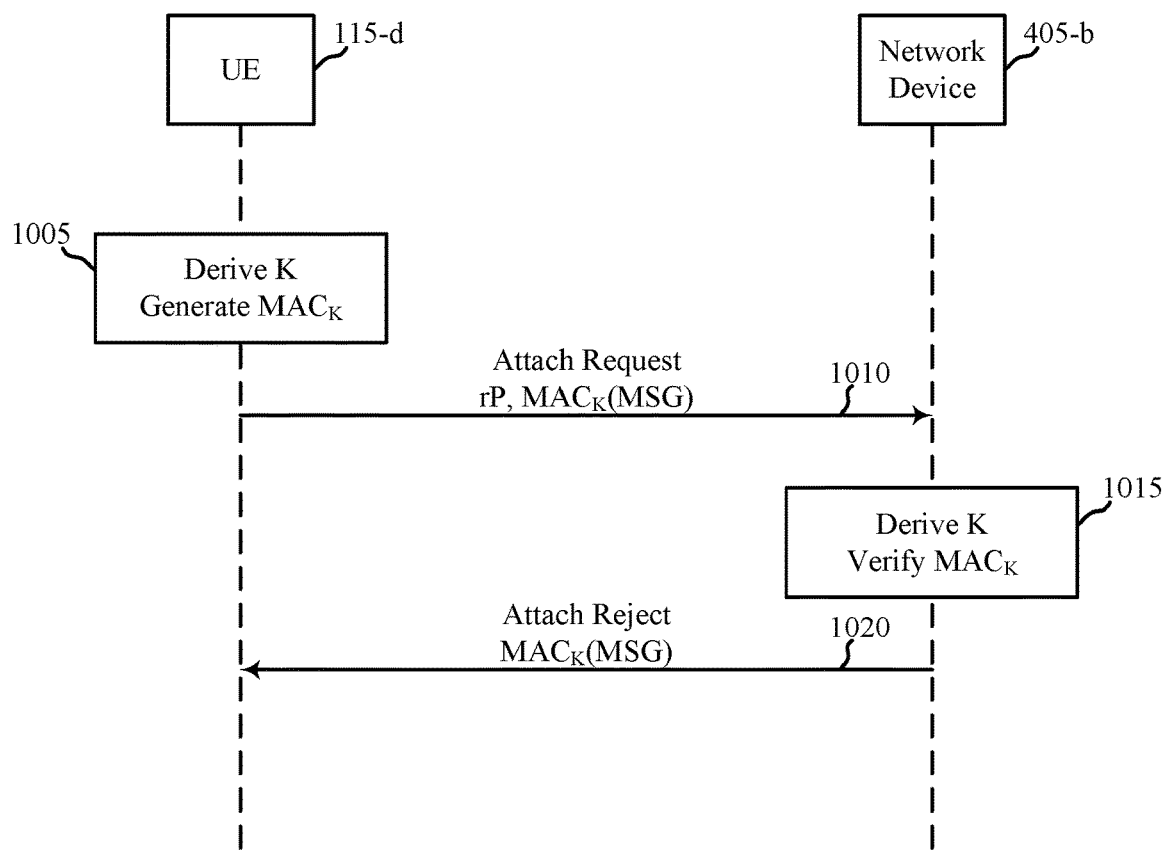
FIG. 10 shows a communication flow in which communication occurs between a UE and a network device, in accordance with one or more aspects of the present disclosure.

FIG. 10 shows a communication flow 1000 in which communication occurs between a UE 115-d and a network device 405-b, in accordance with one or more aspects of the present disclosure. The communication flow 1000 may be used, in some examples, to authenticate transmission of the Attach Request message 330 described with reference to FIG. 3, without first setting up a secure connection between the UE 115-d and the network device 405-b (e.g., without setting up the pre-AKA secure connection at 325 or 325-a in FIG. 3). The UE 115-d may be an example of aspects of the UEs 115 described with reference to FIG. 1, 3, 4, or 5, and the network device 405-b may be an example of aspects of the network access devices 105 (e.g., a radio head, base station, eNB, and/or ANC) described with reference to FIG. 1 or 3, a central node of the core network 130 described with reference to FIG. 1, the MME 305 described with reference to FIG. 3, or the network devices 405 described with reference to FIG. 4 or 5.

At 1005, the UE 115-d may obtain a public key, sP, for a network. The public key, sP, may be based on a private key (s) of the network and a public parameter (P). Using the public key, an ID of the network device 405-b, and a random number (r), the UE 115-d may derive an encryption key (K=(rID, sP)), and a message authentication code ($MAC_K$) based on the encryption key. In some examples, the ID of the network device 405-b may be a Hash of a globally unique mobility management entity identifier (GUMMEI) (i.e., Hash(GUMMEI)) or a Hash of a tracking area identity (TAI) (i.e., Hash(TAI)). When the ID is Hash(GUMMEI), the UE 115-d may obtain the GUMMEI of the network device 405-b from a network access device (e.g., an eNB). When the ID is Hash(TAI), the associated MME(s) may be provisioned with a corresponding private key by their MNO. The message authentication code ($MAC_K$) may be used to encrypt an Attach Request message. At 1010, the UE 115-d may transmit, to the network device 405-b, the encrypted Attach Request message and the parameter rP.

At 1015, the network device 405-b may derive the encryption key, K, for the purpose of decrypting the encrypted Attach Request message. In some examples, the network device 405-b may derive the encryption key, K, based at least in part on the parameter rP, and a private key based on the network's private key and the ID of the network device 405-b. After decrypting the Attach Request message, the network device 405-b may generate a response (e.g., an Attach Reject message), encrypt the Attach Request message using the message authentication code $MAC_K$, and transmit the encrypted Attach Request message to the UE 115-d at 1020.

In alternative examples of the communication flow 1000, the Attach Request message may alternatively be or include a TAU Request message, Service Request message, a Network Capability Query, a Service Query, etc. Also, the Attach Reject message may alternatively be or include a TAU Reject message, or a Service Reject message. Alternatively, the communication flow 1000 may commence with the network device 405-b transmitting a message (e.g., a Detach Request) to the UE 115-d, followed by the UE 115-d transmitting a message to acknowledge the Detach Request.

Figure 11:
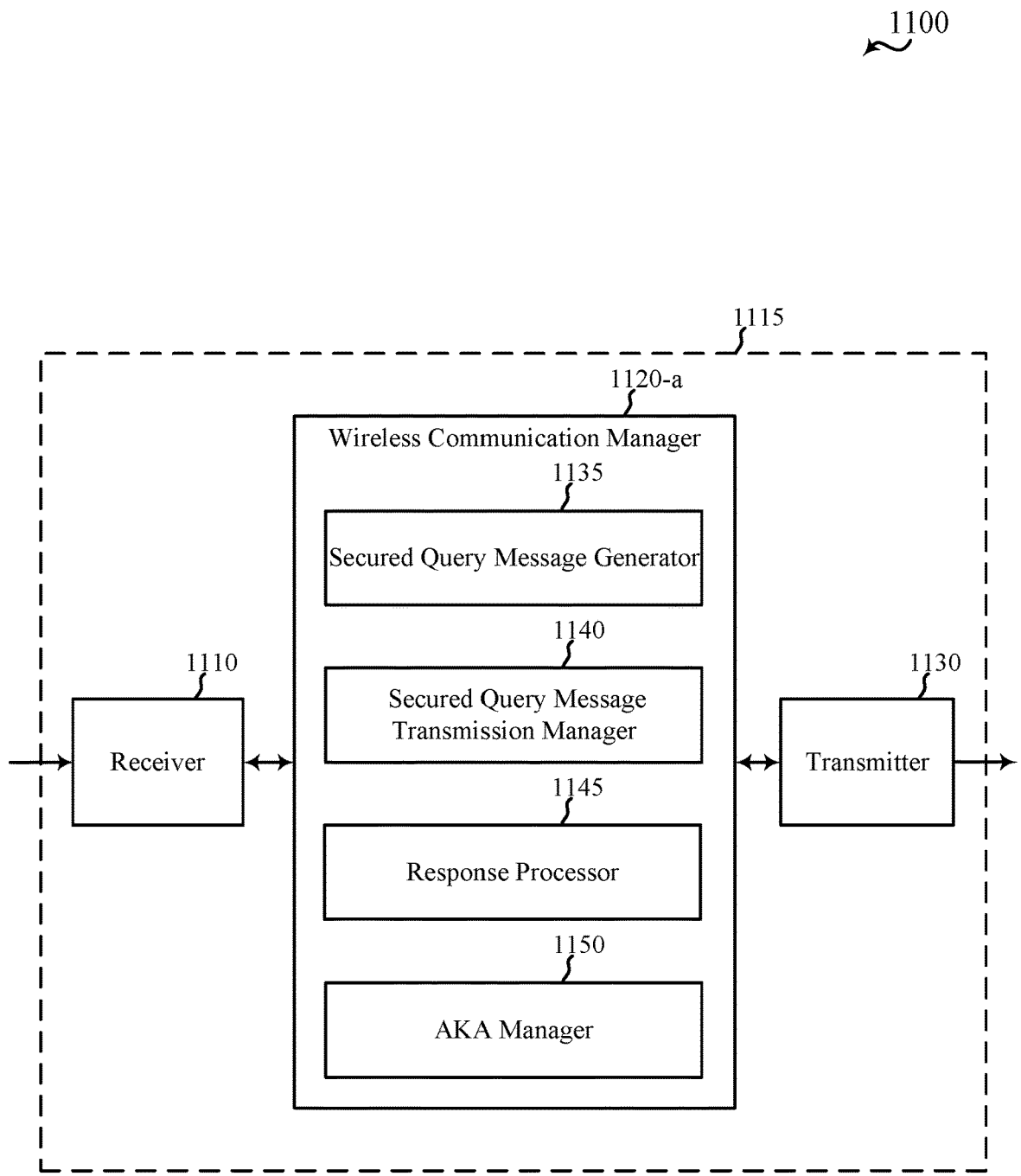
FIG. 11 shows a block diagram of an apparatus for use in wireless communication, in accordance with one or more aspects of the present disclosure.

FIG. 11 shows a block diagram 1100 of an apparatus 1115 for use in wireless communication, in accordance with one or more aspects of the present disclosure. The apparatus 1115 may be an example of aspects of one or more of the UEs 115 described with reference to FIG. 1, 3, 4, 5, or 10. The apparatus 1115 may also be or include a processor. The apparatus 1115 may include a receiver 1110, a wireless communication manager 1120-a, or a transmitter 1130. Each of these components may be in communication with each other.

The components of the apparatus 1115 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one radio frequency (RF) receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIG. 1, 2, 3, 4, 5, 6, 7, 8, 9, or 10. The receiver 1110 may be used to receive various types of data or control signals (i.e., transmissions) over one or more communication links of a wireless communication system, such as one or more communication links of the wireless communication system 100 described with reference to FIG. 1.

In some examples, the transmitter 1130 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIG. 1, 2, 3, 4, 5, 6, 7, 8, 9, or 10. The transmitter 1130 may be used to transmit various types of data or control signals (i.e., transmissions) over one or more communication links of a wireless communication system, such as one or more communication links of the wireless communication system 100 described with reference to FIG. 1.

In some examples, the wireless communication manager 1120-*a* may be used to manage one or more aspects of wireless communication for the apparatus 1115. In some examples, part of the wireless communication manager 1120-*a* may be incorporated into or shared with the receiver 1110 or the transmitter 1130. In some examples, the wireless communication manager 1120-*a* may be an example of aspects of the wireless communication manager 1120 described with reference to FIG. 1. In some examples, the wireless communication manager 1120-*a* may include a secured query message generator 1135, a secured query message transmission manager 1140, a response processor 1145, or an AKA manager 1150.

The secured query message generator 1135 may be used to generate a secured query message based at least in part on a security credential of the apparatus 1115. The secured query message may be generated prior to performing an AKA with a network. In some examples, the secured query message may include an access request, a network capability query, a service query, or a combination thereof. The secured query message transmission manager 1140 may be used to transmit the secured query message generated by the secured query message generator 1135 to the network. The response processor 1145 may be used to receive a response to the secured query message. In some examples, the response may include an acknowledgement of the secured query message transmitted by the secured query message transmission manager 1140 or a message commencing performance of an AKA by the network. The AKA manager 1150 may be used to determine whether to perform the AKA with the network based at least in part on the response received by the response processor 1145.

In some examples of the apparatus 1115, the secured query message generator 1135 may also or alternatively generate the secured query message based at least in part on a network security credential of the network. In some examples, the secured query message may be secured based at least in part on pairing-based cryptography, as described, for example, with reference to FIG. 9 or 10. In some examples, the pairing-based cryptography may include an identity-based encryption, an identity-based signature, or a combination thereof.

Figure 12:
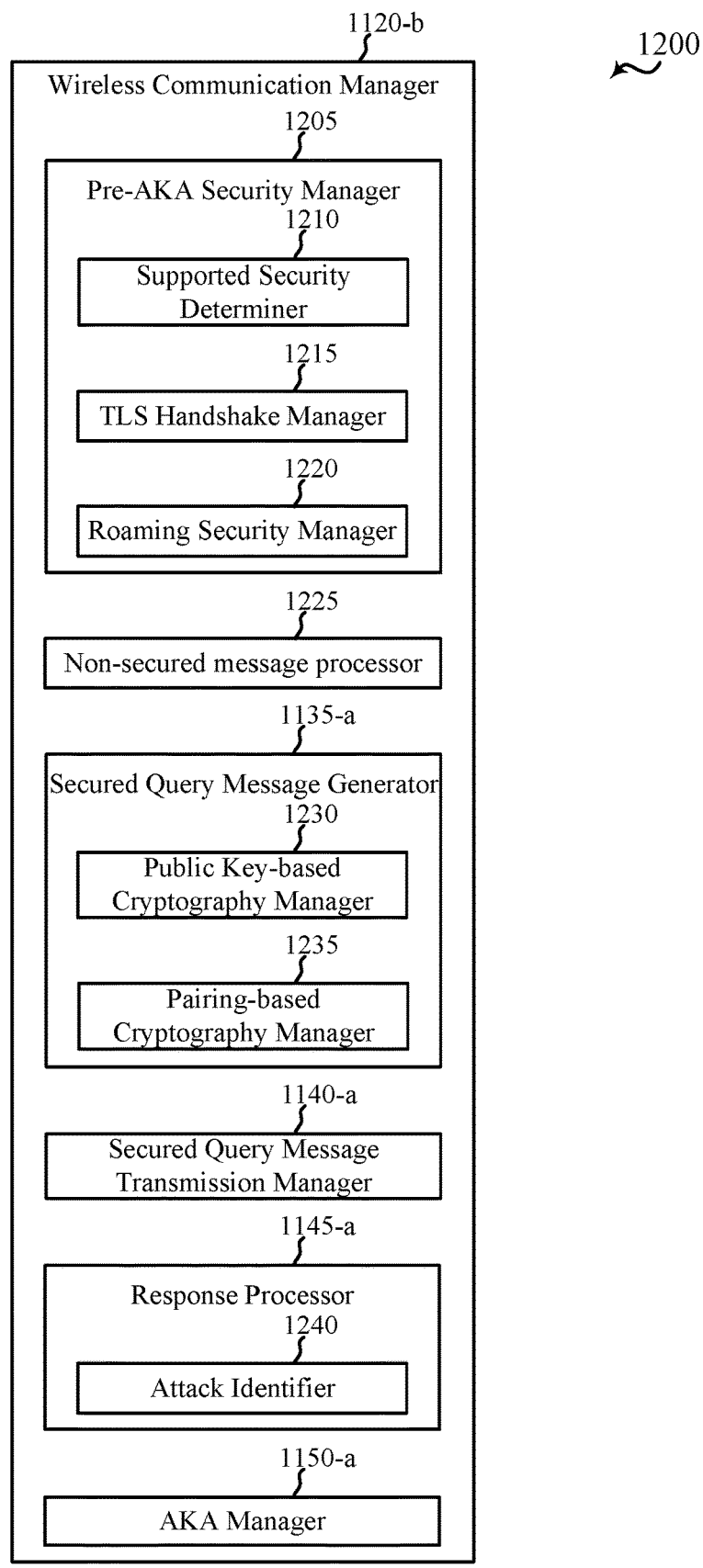
FIG. 12 shows a block diagram of a wireless communication manager for use in wireless communication, in accordance with one or more aspects of the present disclosure.

FIG. 12 shows a block diagram 1200 of a wireless communication manager 1120-*b* for use in wireless communication, in accordance with one or more aspects of the present disclosure. The wireless communication manager 1120-*b* may be an example of aspects of the wireless communication manager 1120 described with reference to FIG. 1 or 11.

The components of the wireless communication manager 1120-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1120-*b* may be used to manage one or more aspects of wireless communication for a wireless communication device (e.g., a UE) or apparatus, such as one of the UEs 115 or apparatuses 1115 described with reference to FIG. 1, 3, 4, 5, 10, or 11. In some examples, part of the wireless communication manager 1120-*b* may be incorporated into or shared with a receiver or a transmitter (e.g., the receiver 1110 or the transmitter 1130 described with reference to FIG. 11). In some examples, the wireless communication manager 1120-*b* may include a pre-AKA security manager 1205, a non-secured message processor 1225, a secured query message generator 1135-*a*, a secured query message transmission manager 1140-*a*, a response processor 1145*a*, or an AKA manager 1150-*a*.

The pre-AKA security manager 1205 may include a supported security determiner 1210, a TLS handshake manager 1215, or a roaming security manager 1220. The supported security determiner 1210 may be used to optionally determine whether a network supports receipt of a secured query message. In some examples, the supported security determiner 1210 may determine whether the network supports receipt of a secured query message based at least in part on a network advertisement received by the wireless communication manager 1120-*b*.

In some examples, the pre-AKA security manager 1205 may be used to optionally establish a secure connection with the network based at least in part on a security credential of an apparatus including the wireless communication manager 1120-*b* and a network security credential of the network, as described, for example, with reference to FIG. 2, 3, or 4. In some examples, the secure connection may be established with a core network (e.g., with a MME). In these (and other) examples, establishing the secure connection may include using the TLS handshake manager 1215 to perform a TLS handshake over a NAS. In other examples, the secure connection may be established with a network access device (e.g., a radio head, base station, eNB, or ANC). In these (and other) examples, establishing the secure connection may include using the TLS handshake manager 1215 to perform a TLS handshake over a RRC connection.

The roaming security manager 1220 may be used to optionally obtain at least one of: a first security credential of a roaming MNO from a first mobile network of a home MNO for the apparatus including the wireless communication manager 1120-b; or a second security credential of the roaming MNO from a second mobile network of the roaming MNO, where the second security credential is signed by the home MNO; or a third security credential of the roaming MNO from a certificate authority common to the home MNO and the roaming MNO; or a combination thereof.

The non-secured message processor 1225 may be used to optionally receive a non-secured message from the network. In some examples, the non-secured message may include a demand to transmit a message, perform an AKA, etc. In response to receiving a non-secured message, and in some examples, the non-secured message processor 1225 may trigger the secured query message generator 1135-a to generate an appropriate secured query message.

The secured query message generator 1135-a may be used to generate a secured query message based at least in part on a security credential of the apparatus including the wireless communication manager 1120-b. In some examples, the secured query message generator 1135-a may also or alternatively generate the secured query message based at least in part on a network security credential of the network. The secured query message may be generated prior to performing an AKA with a network. In some examples, the secured query message may include an access request, a network capability query, a service query, or a combination thereof. In some examples, the secured query message may be generated in response to a non-secured message received by the non-secured message processor 1225. In some examples, the secured query message may be generated based at least in part on a type of security determined by the supported security determiner 1210.

In some examples, the secured query message generator 1135-a may include a public key-based cryptography manager 1230 or a pairing-based cryptography manager 1235. The public key-based cryptography manager 1230 may be used to generate a secured query message for transmission to the network using a secure connection, as described, for example, with reference to FIG. 2, 3, or 4. The pairing-based cryptography manager 1235 may be used to generate a secured query message (for transmission to the network) based at least in part on pairing-based cryptography, as described, for example, with reference to FIG. 9 or 10. In some examples, the pairing-based cryptography may include an identity-based encryption, an identity-based signature, or a combination thereof.

The secured query message transmission manager 1140-a may be used to transmit the secured query message generated by the secured query message generator 1135-a to the network. In some examples, the secured query message may be transmitted to the network using a secure connection established by the pre-AKA security manager 1205 or the TLS handshake manager 1215.

The response processor 1145-a may be used to receive a response to the secured query message. In some examples, the response may include an acknowledgement of the secured query message transmitted by the secured query message transmission manager 1140-a or a message commencing performance of an AKA by the network. In some examples, the response processor 1145-a may determine whether a received response is associated with expected security credentials (e.g., the security credential of the apparatus including the wireless communication manager 1120-b and a network security credential of the network). Upon determining that a received response is associated with expected security credential(s), the response processor 1145-a may further determine whether the received response includes a message that causes the apparatus including the wireless communication manager 1120-b a denial of service. Upon determining that the received response does not cause the wireless communication device a denial of service, the response processor 1145-a may forward the response to the AKA manager 1150-a. Upon determining that the received response causes the apparatus including the wireless communication manager 1120-b a denial of service, the response processor 1145-a may cause the apparatus including the wireless communication manager 1120-b to refrain from accessing the network.

In some examples, the response processor 1145-a may include an attack identifier 1240. The attack identifier 1240 may be used to determine when a received response is not associated with expected security credentials (e.g., the security credential of the apparatus including the wireless communication manager 1120-b or a network security credential of the network), and to cause the AKA manager 1150-a to refrain from considering such a response when determining whether to perform an AKA with the network.

The AKA manager 1150-a may be used to determine whether to perform the AKA with the network, based at least in part on a response received in by the response processor 1145-a. When performed, and in some examples, the AKA may be performed using a secure connection established by the pre-AKA security manager 1205 or TLS handshake manager 1215. The AKA may also be performed using pairing-based cryptography.

Figure 13:
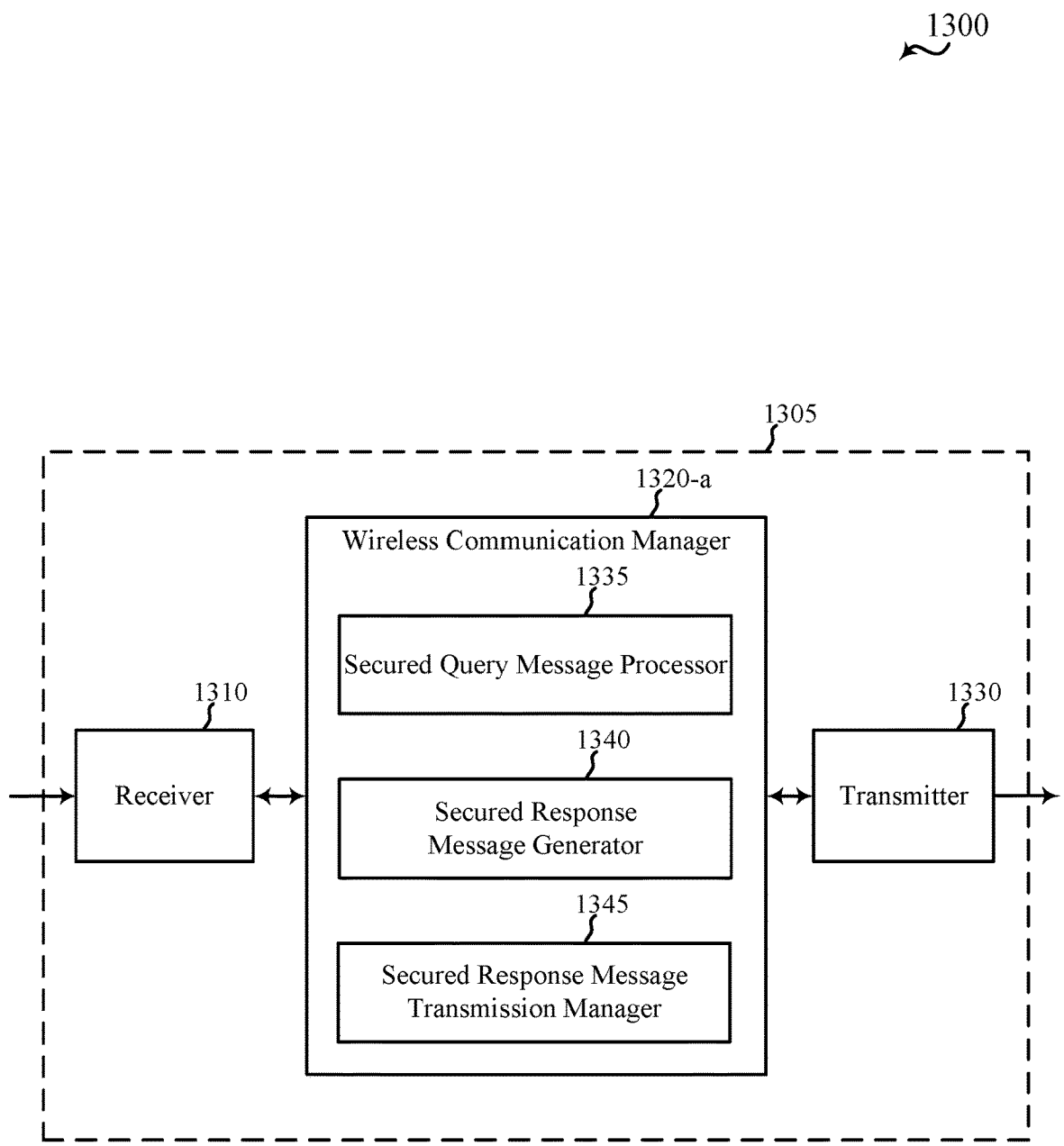
FIG. 13 shows a block diagram of an apparatus for use in wireless communication, in accordance with one or more aspects of the present disclosure.

FIG. 13 shows a block diagram 1300 of an apparatus 1305 for use in wireless communication, in accordance with one or more aspects of the present disclosure. The apparatus 1305 may be an example of aspects of one or more of the network access device 105 (e.g., a radio head, a base station, an eNB, or an ANC) described with reference to FIG. 1, 3, or 16, or aspects of the core network 130 described with reference to FIG. 1, or aspects of the network device 405 described with reference to FIG. 4, 5, or 10. The apparatus 1305 may also be or include a processor. The apparatus 1305 may include a receiver 1310, a wireless communication manager 1320-a, or a transmitter 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1310 may include at least one RF receiver, such as at least one RF receiver operable to receive transmissions over one or more radio frequency spectrum bands. In some examples, the one or more radio frequency spectrum bands may be used for LTE/LTE-A or 5G communications, as described, for example, with reference to FIG. 1, 2, 3, 4, 5, 6, 7, 8, 9, or 10. The receiver 1310 may be used to receive various types of data or control signals (i.e., transmissions) over one or more communication links of a wireless communication system, such as one or more communication links of the wireless communication system 100 described with reference to FIG. 1.

In some examples, the transmitter 1330 may include at least one RF transmitter, such as at least one RF transmitter operable to transmit over one or more radio frequency spectrum bands. In some examples, the one or more radio frequency spectrum bands may be used for LTE/LTE-A or 5G communications, as described, for example, with reference to FIG. 1, 2, 3, 4, 5, 6, 7, 8, 9, or 10. The transmitter 1330 may be used to transmit various types of data or control signals (i.e., transmissions) over one or more communication links of a wireless communication system, such as one or more communication links of the wireless communication system 100 described with reference to FIG. 1.

In some examples, the wireless communication manager 1320-*a* may be used to manage one or more aspects of wireless communication for the apparatus 1305. In some examples, part of the wireless communication manager 1320-*a* may be incorporated into or shared with the receiver 1310 or the transmitter 1330. In some examples, the wireless communication manager 1320-*a* may be an example of aspects of the wireless communication manager 1320 described with reference to FIG. 1. In some examples, the wireless communication manager 1320-*a* may include a secured query message processor 1335, a secured response message generator 1340, or a secured response message transmission manager 1345.

The secured query message processor 1335 may be used to receive a secured query message over a network, from a wireless communication device (e.g., a UE), prior to performing an AKA with the wireless communication device. The secured query message may be based at least in part on a security credential of the wireless communication device. In some examples, the secured query message may include an access request, a network capability query, a service query, or a combination thereof. The secured response message generator 1340 may be used to generate, in response to receiving the secured query message, a secured response message based at least in part on a network security credential of the apparatus 1305. In some examples, the response may include an acknowledgement of the secured query message or a message commencing performance of an AKA by the network. In some examples, the secured response message may include a message that causes the wireless communication device a denial of service. The secured response message transmission manager 1345 may be used to transmit the secured response message to the wireless communication device.

In some examples of the apparatus 1305, the secured query message received by the secured query message processor 1335 may also or alternatively be based at least in part on the network security credential of the network. In some examples, the secured response message generated by the secured response message generator 1340 may also or alternatively be based at least in part on the security credential of the wireless communication device. In some examples, the secured query message or secured response message may be secured based at least in part on pairing-based cryptography, as described, for example, with reference to FIG. 9 or 10. In some examples, the pairing-based cryptography may include an identity-based encryption, an identity-based signature, or a combination thereof.

Figure 14:
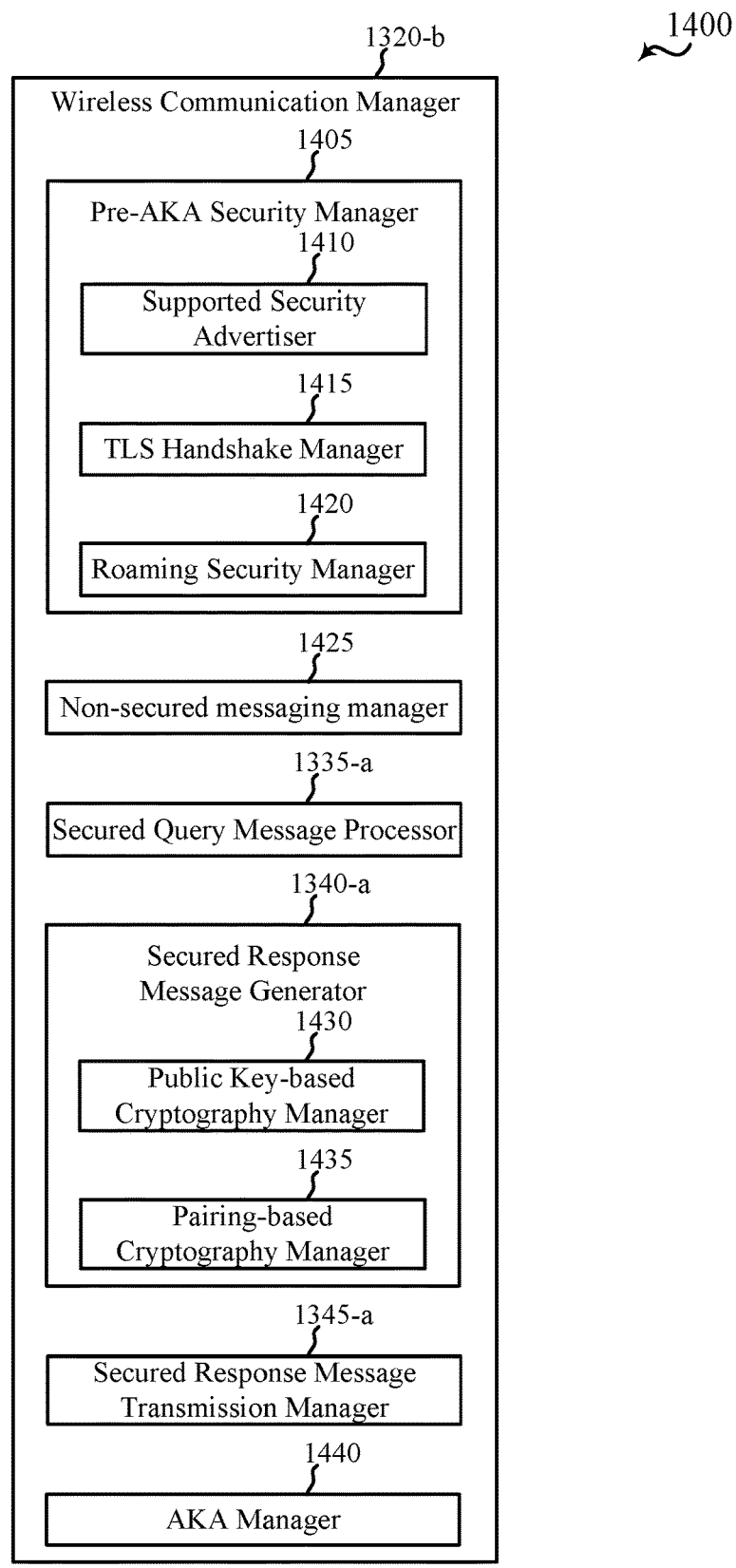
FIG. 14 shows a block diagram of a wireless communication manager for use in wireless communication, in accordance with one or more aspects of the present disclosure.

FIG. 14 shows a block diagram 1400 of a wireless communication manager 1320-*b* for use in wireless communication, in accordance with one or more aspects of the present disclosure. The wireless communication manager 1320-*b* may be an example of aspects of the wireless communication manager 1320 described with reference to FIG. 1 or 13.

The components of the wireless communication manager 1320-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1320-*b* may be used to manage one or more aspects of wireless communication for a wireless communication device (e.g., a network access device or device of a core network) or apparatus, such as one of the network access devices 105, network devices 405, or apparatuses 1305 described with reference to FIG. 1, 3, 4, 5, 10, or 13. In some examples, part of the wireless communication manager 1320-*b* may be incorporated into or shared with a receiver or a transmitter (e.g., the receiver 1310 or the transmitter 1330 described with reference to FIG. 13). In some examples, the wireless communication manager 1320-*b* may include a pre-AKA security manager 1405, a non-secured messaging manager 1425, a secured query message processor 1335-*a*, a secured response message generator 1340-*a*, a secured response message transmission manager 1345-*a*, or an AKA manager 1440.

The pre-AKA security manager 1405 may include a supported security advertiser 1410, a TLS handshake manager 1415, or a roaming security manager 1420. The supported security advertiser 1410 may be used to optionally advertise that a network associated with an apparatus including the wireless communication manager 1320-*b* supports a secured query message. In some examples, the advertising may include broadcasting a network advertisement over the network.

In some examples, the pre-AKA security manager 1405 may be used to optionally establish a secure connection with a wireless communication device (e.g., a UE) based at least in part on a security credential of the wireless communication device and a network security credential of the apparatus including the wireless communication manager 1320-*b*, as described, for example, with reference to FIG. 2, 3, or 4. In some examples, the apparatus including the wireless communication manager 1320-*b* may include part of a core network (e.g., a MME). In these (and other) examples, establishing the secure connection may include using the TLS handshake manager 1415 to perform a TLS handshake over a NAS. In other examples, the apparatus including the wireless communication manager 1320-*b* may include a network access device (e.g., a radio head, base station, eNB, or ANC). In these (and other) examples, establishing the secure connection may include using the TLS handshake manager 1415 to perform a TLS handshake over a RRC connection.

The roaming security manager 1420 may be used to optionally transmit, to the wireless communication device, a security credential of a roaming MNO. The security credential of the roaming MNO may be transmitted to the wireless communication device over a first mobile network of a home MNO with which the network device and wireless communication device are associated.

The non-secured messaging manager 1425 may be used to optionally transmit a non-secured message to the wireless communication device. In some examples, the non-secured message may include a demand to transmit a message, perform an AKA, etc.

The secured query message processor 1335-a may be used to receive a secured query message over a network, from a wireless communication device, prior to performing an AKA with the wireless communication device. The secured query message may be based at least in part on a security credential of the wireless communication device. In some examples, the secured query message may also or alternatively be based at least in part on a network security credential of the network. In some examples, the secured query message may include an access request, a network capability query, a service query, or a combination thereof. In some examples, the secured query message may be received in response to the non-secured messaging manager 1425 transmitting a non-secured message.

The secured response message generator 1340-a may be used to generate, in response to receiving the secured query message, a secured response message based at least in part on a network security credential of an apparatus including the wireless communication manager 1320-b. In some examples, the secured response message generator 1340-a may also or alternatively generate the secured response message based at least in part on a security credential of a wireless communication device. In some examples, the response may include an acknowledgement of the secured query message or a message commencing performance of an AKA by the network. In some examples, the secured response message may include a message that causes the wireless communication device a denial of service.

In some examples, the secured response message generator 1340-a may include a public key-based cryptography manager 1430 or a pairing-based cryptography manager 1435. The public key-based cryptography manager 1430 may be used to generate a secured response message for transmission to a wireless communication device using a secure connection, as described, for example, with reference to FIG. 2, 3, or 4. The pairing-based cryptography manager 1435 may be used to generate a secured response message (for transmission to a wireless communication device) based at least in part on pairing-based cryptography, as described, for example, with reference to FIG. 9 or 10. In some examples, the pairing-based cryptography may include an identity-based encryption, an identity-based signature, or a combination thereof.

The secured response message transmission manager 1345-a may be used to transmit the secured response message to the wireless communication device.

The AKA manager 1440 may be used to optionally perform an AKA with a wireless communication device. When performed, and in some examples, the AKA may be performed using a secure connection established by the pre-AKA security manager 1405 or TLS handshake manager 1415. The AKA may also be performed using pairing-based cryptography.

Figure 15:
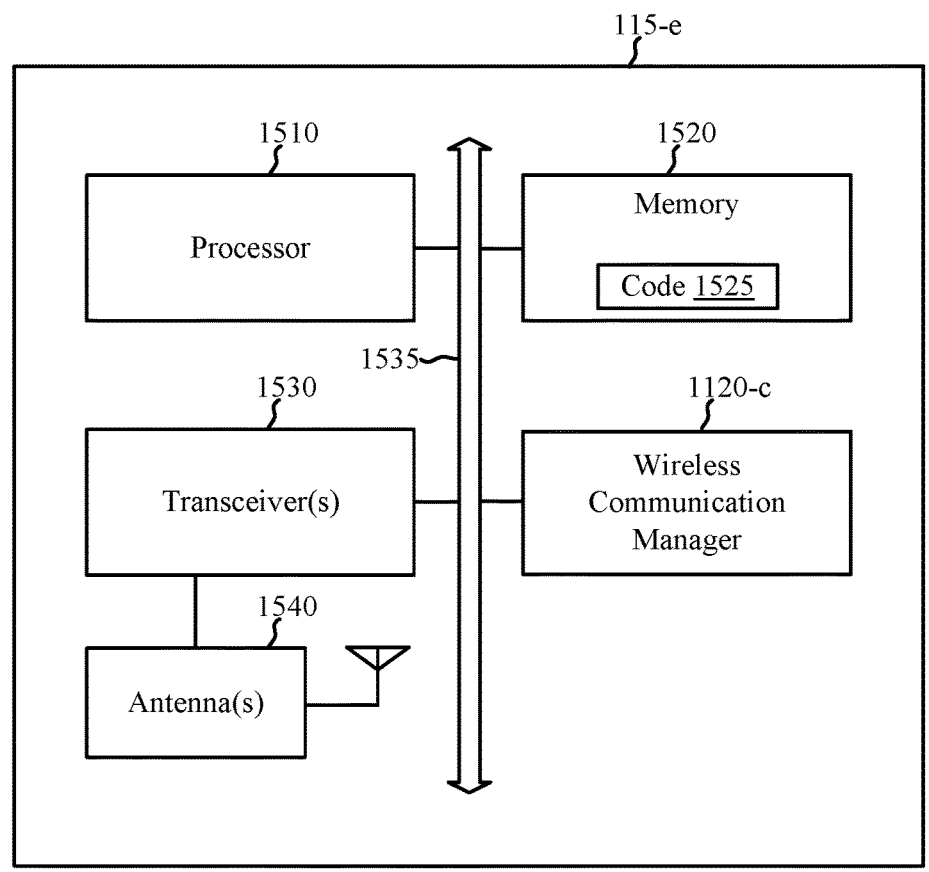
FIG. 15 shows a block diagram of a UE for use in wireless communication, in accordance with one or more aspects of the present disclosure.

FIG. 15 shows a block diagram 1500 of a UE 115-e for use in wireless communication, in accordance with one or more aspects of the present disclosure. The UE 115-e may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-e may, in some examples, have an internal power supply (not shown), such as a small battery, to facilitate mobile operation. In some examples, the UE 115-e may be an example of aspects of one or more of the UEs 115 described with reference to FIG. 1, 3, 4, 5, or 10, or aspects of the apparatus 1115 described with reference to FIG. 11. The UE 115-e may be configured to implement at least some of the UE or apparatus techniques and functions described with reference to FIG. 1, 2, 3, 4, 5, 6, 7, 8, 9, 10, 11, or 12.

The UE 115-e may include a processor 1510, a memory 1520, at least one transceiver (represented by transceiver(s) 1530), at least one antenna (represented by antenna(s) 1540), or a wireless communication manager 1120-c. Each of these components may be in communication with each other, directly or indirectly, over one or more buses 1535.

The memory 1520 may include random access memory (RAM) or read-only memory (ROM). The memory 1520 may store computer-readable, computer-executable code 1525 containing instructions that are configured to, when executed, cause the processor 1510 to perform various functions described herein related to wireless communication, including, for example, transmitting or receiving secure signaling before performing an AKA with a network. Alternatively, the computer-executable code 1525 may not be directly executable by the processor 1510 but be configured to cause the UE 115-e (e.g., when compiled and executed) to perform various of the functions described herein.

The processor 1510 may include an intelligent hardware device, e.g., a central processing unit (CPU), a microcontroller, an ASIC, etc. The processor 1510 may process information received through the transceiver(s) 1530 or information to be sent to the transceiver(s) 1530 for transmission through the antenna(s) 1540. The processor 1510 may handle, alone or in connection with the wireless communication manager 1120-c, various aspects of communicating over (or managing communications over) one or more radio frequency spectrum bands.

The transceiver(s) 1530 may include a modem configured to modulate packets and provide the modulated packets to the antenna(s) 1540 for transmission, and to demodulate packets received from the antenna(s) 1540. The transceiver(s) 1530 may, in some examples, be implemented as one or more transmitters and one or more separate receivers. The transceiver(s) 1530 may support communications in one or more radio frequency spectrum bands. The transceiver(s) 1530 may be configured to communicate bi-directionally, via the antenna(s) 1540, with one or more of the network access devices 105 described with reference to FIG. 1, 3, 4, 5, or 10, or the apparatus 1305 described with reference to FIG. 13. While the UE 115-e may include a single antenna, there may be examples in which the UE 115-e may include multiple antennas 1540.

The wireless communication manager 1120-c may be configured to perform or control some or all of the UE or apparatus techniques or functions described with reference to FIG. 1, 2, 3, 4, 5, 6, 7, 8, 9, 10, 11, or 12 related to wireless communication over one or more radio frequency spectrum bands. The wireless communication manager 1120-c, or portions of it, may include a processor, or some or all of the functions of the wireless communication manager 1120-c may be performed by the processor 1510 or in connection with the processor 1510. In some examples, the wireless communication manager 1120-c may be an example of the wireless communication manager 1120 described with reference to FIG. 1, 11, or 12.

Figure 16:
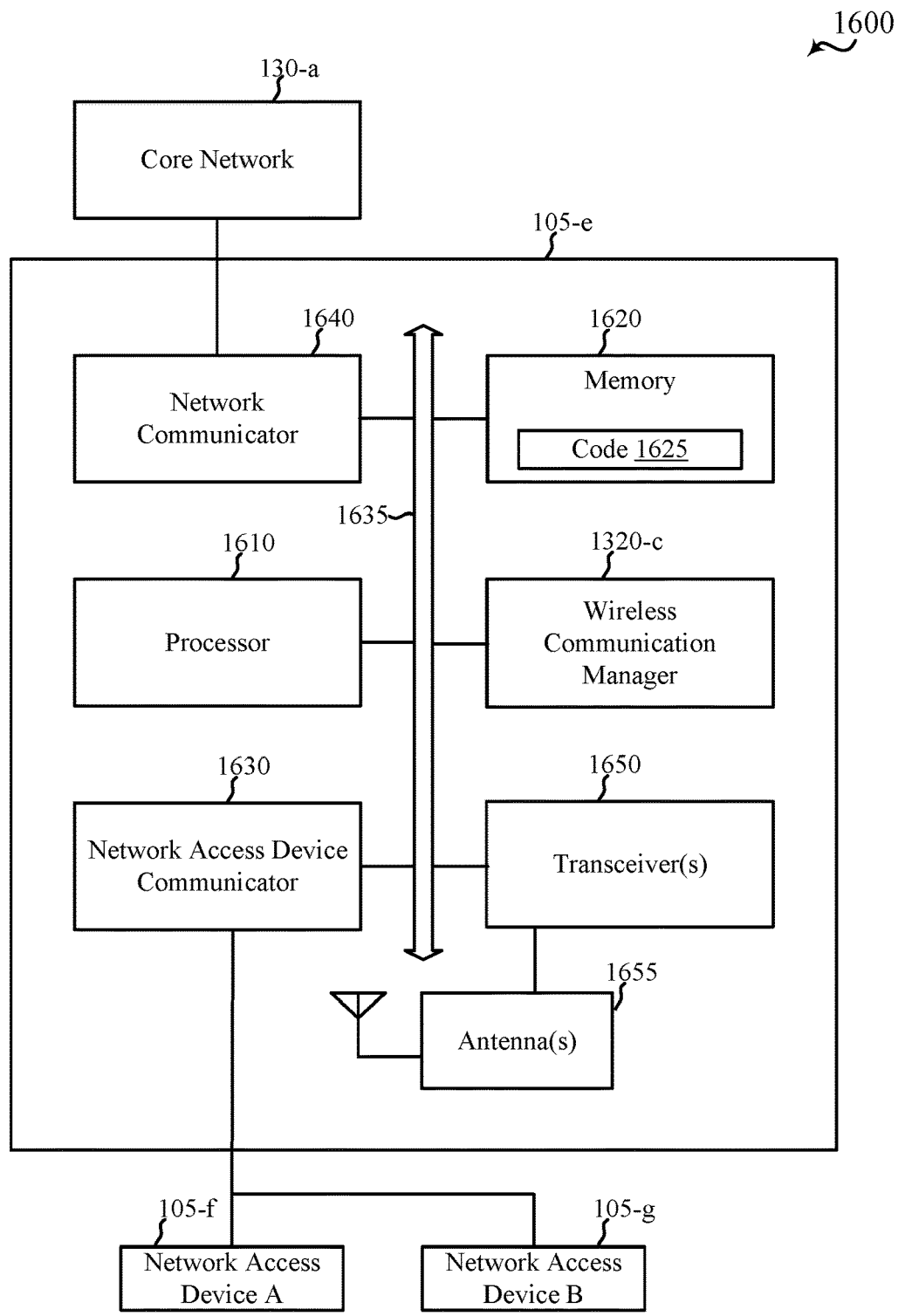
FIG. 16 shows a block diagram of a network access device for use in wireless communication, in accordance with one or more aspects of the present disclosure.

FIG. 16 shows a block diagram 1600 of a network access device 105-e for use in wireless communication, in accordance with one or more aspects of the present disclosure. In some examples, the network access device 105-*e* may be an example of one or more aspects of a network access device 105 (e.g., a radio head, a base station, an eNB, or an ANC) described with reference to FIG. 1 or 3, aspects of a network device 405 described with reference to FIG. 4, 5, or 10, or aspects of the apparatus 1305 described with reference to FIG. 13. The network access device 105-*e* may be configured to implement or facilitate at least some of the network access device techniques and functions described with reference to FIG. 1, 2, 3, 4, 5, 6, 7, 8, 9, 10, 13, or 14.

The network access device 105-*e* may include a processor 1610, a memory 1620, at least one transceiver (represented by transceiver(s) 1650), at least one antenna (represented by base station antenna(s) 1655), or a wireless communication manager 1320-*c*. The network access device 105-*e* may also include one or more of a network access device communicator 1630 or a network communicator 1640. Each of these components may be in communication with each other, directly or indirectly, over one or more buses 1635.

The memory 1620 may include RAM or ROM. The memory 1620 may store computer-readable, computer-executable code 1625 containing instructions that are configured to, when executed, cause the processor 1610 to perform various functions described herein related to wireless communication, including, for example, transmitting or receiving secure signaling before performing an AKA with a wireless communication device. Alternatively, the computer-executable code 1625 may not be directly executable by the processor 1610 but be configured to cause the network access device 105-*e* (e.g., when compiled and executed) to perform various of the functions described herein.

The processor 1610 may include an intelligent hardware device, e.g., a CPU, a microcontroller, an ASIC, etc. The processor 1610 may process information received through the transceiver(s) 1650, the network access device communicator 1630, or the network communicator 1640. The processor 1610 may also process information to be sent to the transceiver(s) 1650 for transmission through the antenna(s) 1655, to the network access device communicator 1630, for transmission to one or more other network access devices (e.g., network access device 105-*f* and network access device 105-*g*), or to the network communicator 1640 for transmission to a core network 130-*a*, which may be an example of one or more aspects of the core network 130 described with reference to FIG. 1. The processor 1610 may handle, alone or in connection with the wireless communication manager 1320-*c*, various aspects of communicating over (or managing communications over) one or more radio frequency spectrum bands.

The transceiver(s) 1650 may include a modem configured to modulate packets and provide the modulated packets to the antenna(s) 1655 for transmission, and to demodulate packets received from the antenna(s) 1655. The transceiver(s) 1650 may, in some examples, be implemented as one or more transmitters and one or more separate receivers. The transceiver(s) 1650 may support communications in one or more radio frequency spectrum bands. The transceiver(s) 1650 may be configured to communicate bi-directionally, via the antenna(s) 1655, with one or more UEs or apparatuses, such as one or more of the UEs 115 described with reference to FIG. 1, 3, 4, 5, 10, or 15, or the apparatus 1115 described with reference to FIG. 11. The network access device 105-*e* may, for example, include multiple antennas 1655 (e.g., an antenna array). The network access device 105-*e* may communicate with the core network 130-*a* through the network communicator 1640. The network access device 105-*e* may also communicate with other network access devices, such as the network access device 105-*f* and the network access device 105-*g*, using the network access device communicator 1630.

The wireless communication manager 1320-*c* may be configured to perform or control some or all of the network access device or apparatus techniques or functions described with reference to FIG. 1, 2, 3, 4, 5, 6, 7, 8, 9, 10, 13, or 14 related to wireless communication over one or more radio frequency spectrum bands. The wireless communication manager 1320-*c*, or portions of it, may include a processor, or some or all of the functions of the wireless communication manager 1320-*c* may be performed by the processor 1610 or in connection with the processor 1610. In some examples, the wireless communication manager 1320-*c* may be an example of the wireless communication manager 1320 described with reference to FIG. 1, 13, or 14.

Figure 17:
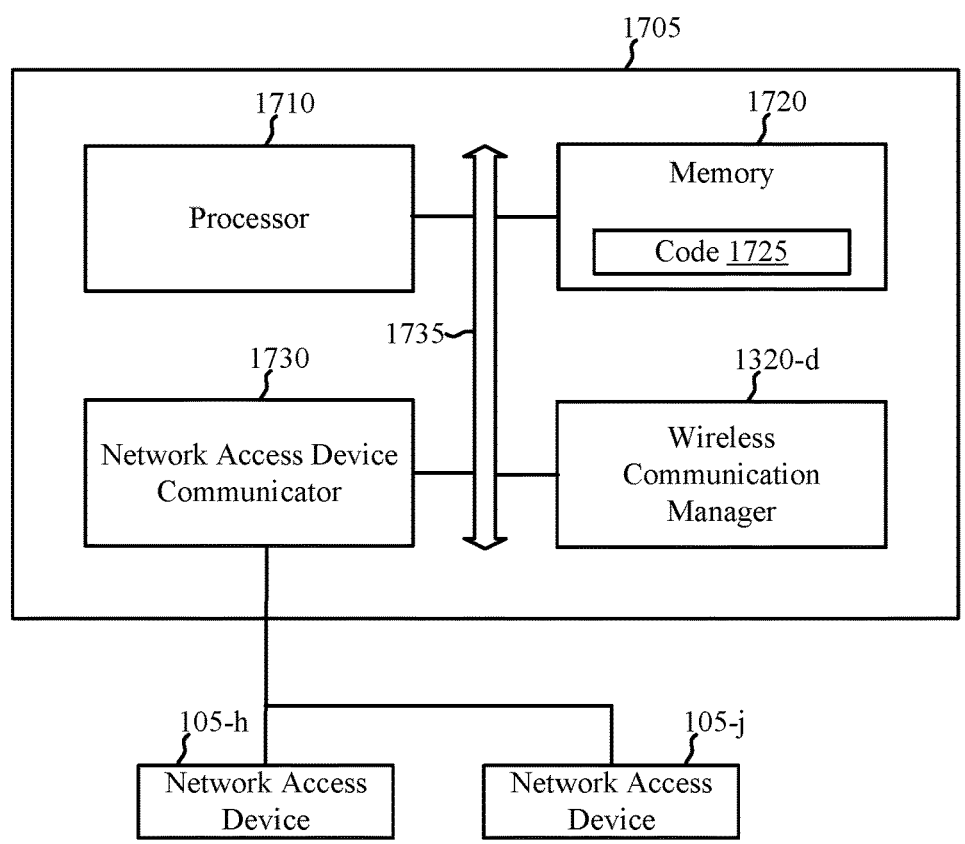
FIG. 17 shows a block diagram of a central node, in accordance with one or more aspects of the present disclosure.

FIG. 17 shows a block diagram 1700 of a central node 1705, in accordance with one or more aspects of the present disclosure. In some examples, the central node 1705 may be an example of aspects of a node of a core network (e.g., a node of the core network 130 described with reference to FIG. 1 or 16, or the MME 305 described with reference to FIG. 3), or the network device 405 described with reference to FIG. 4, 5, or 10. The central node 1705 may be configured to implement at least some of the core network, MME, or apparatus functions described with reference to FIG. 1, 2, 3, 4, 5, 6, 7, 8, 9, 10, 13, 14, or 16.

The central node 1705 may include a processor 1710, a memory 1720, a network access device communicator 1730, or a wireless communication manager 1320-*d*. Each of these components may be in communication with each other, directly or indirectly, over one or more buses 1735.

The memory 1720 may include RAM or ROM. The memory 1720 may store computer-readable, computer-executable code 1725 containing instructions that are configured to, when executed, cause the processor 1710 to perform various functions described herein related to wireless communication, including, for example, transmitting or receiving secure signaling before performing an AKA with a wireless communication device. Alternatively, the computer-executable code 1725 may not be directly executable by the processor 1710 but be configured to cause the central node 1705 (e.g., when compiled and executed) to perform various of the functions described herein.

The processor 1710 may include an intelligent hardware device, e.g., a CPU, a microcontroller, an ASIC, etc. The processor 1710 may process information received through the network access device communicator 1730 or information to be sent to one or more network access devices (e.g., radio heads, base stations, eNBs, or ANCs) via the network access device communicator 1730. The processor 1710 may handle, alone or in connection with the wireless communication manager 1320-*d*, one or more aspects of communicating over (or managing communications over) one or more radio frequency spectrum bands.

The network access device communicator 1730 may be used by the central node 1705 to communicate with one or more network access devices 105-*h* or 105-*j*. The network access device communicator 1730 may be configured to communicate bi-directionally with the one or more of the network access devices 105-*h* or 105-*j*. In some examples, the network access device 105-*h* or 105-*j* may be an example of aspects of one or more of the network access devices 105 described with reference to FIG. 1, 3, or 16, aspects of one or more of the network devices 405 described with reference to FIG. 4, 5, or 10, or aspects of the apparatus 1305 described with reference to FIG. 13.

The wireless communication manager 1320-d may be configured to perform or control some or all of the central node or apparatus techniques or functions described with reference to FIG. 1, 2, 3, 4, 5, 6, 7, 8, 9, 10, 13, or 14. The wireless communication manager 1320-d, or portions of it, may include a processor, or some or all of the functions of the wireless communication manager 1320-d may be performed by the processor 1710 or in connection with the processor 1710. In some examples, the wireless communication manager 1320-d may be an example of the wireless communication manager 1320 described with reference to FIG. 1, 13, or 14.

Figure 18:
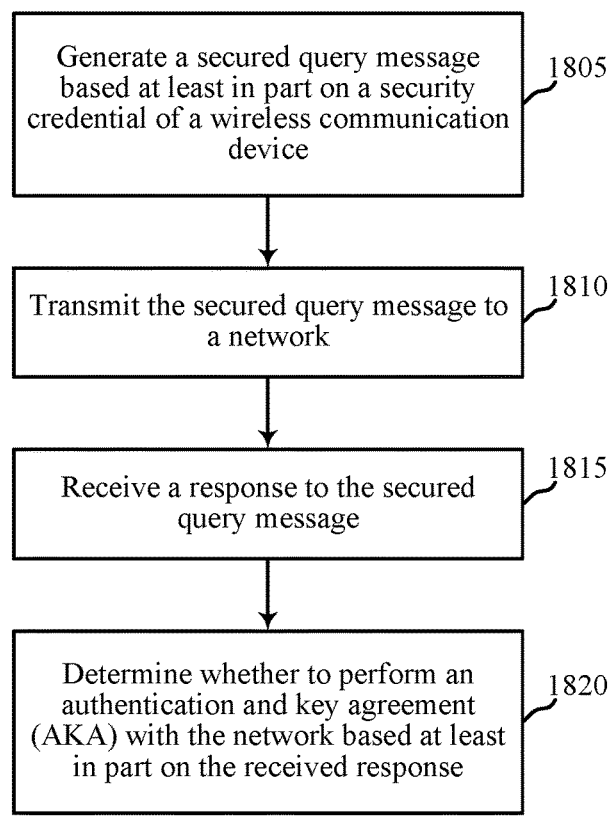
FIG. 18 is a flow chart illustrating an example of a method of wireless communication at a wireless communication device, in accordance with one or more aspects of the present disclosure.

FIG. 18 is a flow chart illustrating an example of a method 1800 of wireless communication at a wireless communication device, in accordance with one or more aspects of the present disclosure. For clarity, the method 1800 is described below with reference to aspects of one of the UE 115 described with reference to FIG. 1, 3, 4, 5, 10, or 15, aspects of the apparatus 1115 described with reference to FIG. 11, or aspects of one of the wireless communication managers 1120 described with reference to FIG. 1, 11, 12, or 14. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1805, the method 1800 may include generating a secured query message based at least in part on a security credential of the wireless communication device. The secured query message may be generated prior to performing an AKA with a network. In some examples, the secured query message may include an access request, a network capability query, a service query, or a combination thereof. The operation(s) at block 1805 may be performed using the wireless communication manager 1120 described with reference to FIG. 1, 11, 12, or 14, or the secured query message generator 1135 described with reference to FIG. 11 or 12.

At block 1810, the method 1800 may include transmitting the secured query message to the network. The operation(s) at block 1810 may be performed using the wireless communication manager 1120 described with reference to FIG. 1, 11, 12, or 14, or the secured query message transmission manager 1140 described with reference to FIG. 11 or 12.

At block 1815, the method 1800 may include receiving a response to the secured query message. In some examples, the response may include an acknowledgement of the secured query message or a message commencing performance of an AKA by the network. In some examples, the response may include a message that causes the wireless communication device a denial of service. The operation(s) at block 1815 may be performed using the wireless communication manager 1120 described with reference to FIG. 1, 11, 12, or 14, or the response processor 1145 described with reference to FIG. 11 or 12.

At block 1820, the method 1800 may include determining whether to perform the AKA with the network based at least in part on the received response (i.e., the response received at block 1815). The operation(s) at block 1820 may be performed using the wireless communication manager 1120 described with reference to FIG. 1, 11, 12, or 14, or the AKA manager 1150 described with reference to FIG. 11 or 12.

In some examples of the method 1800, the secured query message may also or alternatively be generated (at block 1805) based at least in part on a network security credential of the network. In some examples, the secured query message may be secured based at least in part on pairing-based cryptography, as described, for example, with reference to FIG. 9 or 10. In some examples, the pairing-based cryptography may include an identity-based encryption, an identity-based signature, or a combination thereof. When the secured query message is secured based at least in part on pairing-based cryptography, and in some examples, an AKA (if performed) may also be performed using pairing-based cryptography.

Figure 19:
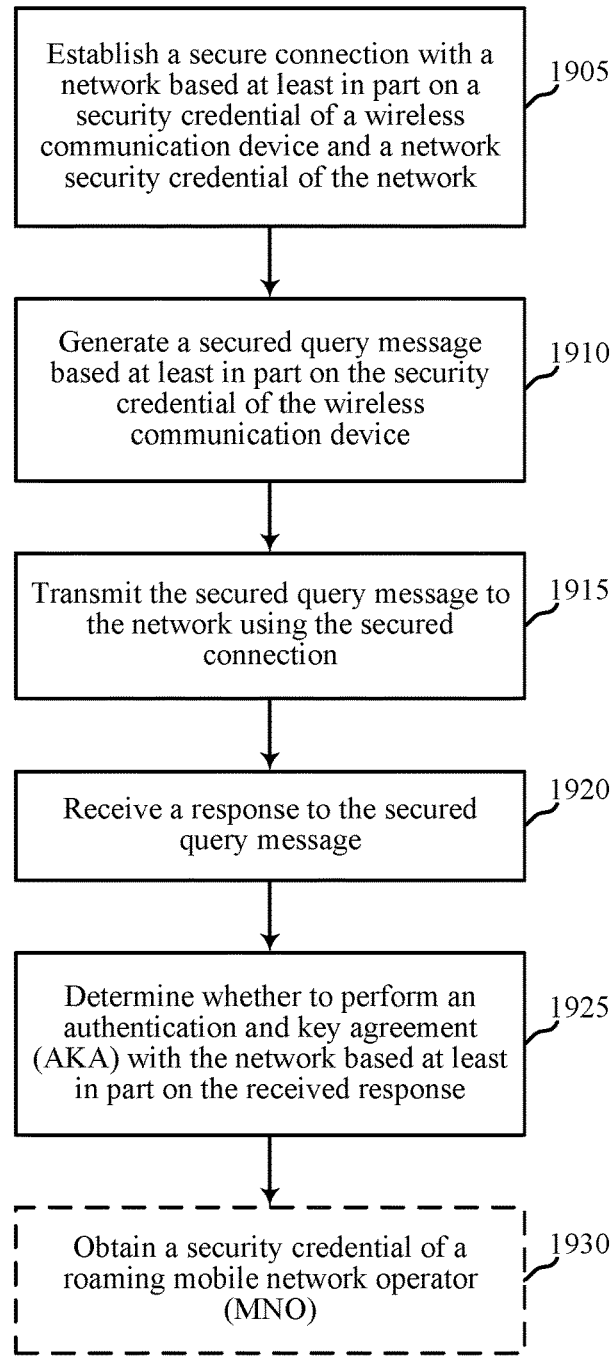
FIG. 19 is a flow chart illustrating an example of a method of wireless communication at a wireless communication device, in accordance with one or more aspects of the present disclosure.

FIG. 19 is a flow chart illustrating an example of a method 1900 of wireless communication at a wireless communication device, in accordance with one or more aspects of the present disclosure. For clarity, the method 1900 is described below with reference to aspects of one of the UE 115 described with reference to FIG. 1, 3, 4, 5, 10, or 15, aspects of the apparatus 1115 described with reference to FIG. 11, or aspects of one of the wireless communication managers 1120 described with reference to FIG. 1, 11, 12, or 14. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1905, the method 1900 may include establishing a secure connection with a network based at least in part on a security credential of the wireless communication device and a network security credential of the network, as described, for example, with reference to FIG. 2, 3, or 4. In some examples, the secure connection may be established with a core network (e.g., with a MME). In these (and other) examples, establishing the secure connection may include performing a TLS handshake over a NAS. In other examples, the secure connection may be established with a network access device (e.g., a radio head, base station, eNB, or ANC). In these (and other) examples, establishing the secure connection may include performing a TLS handshake over a RRC connection. The operation(s) at block 1905 may be performed using the wireless communication manager 1120 described with reference to FIG. 1, 11, 12, or 14, or the pre-AKA security manager 1205 or TLS handshake manager 1215 described with reference to FIG. 12.

At block 1910, the method 1900 may include generating a secured query message based at least in part on the security credential of the wireless communication device, as described, for example, with reference to FIG. 2, 3, or 4. The secured query message may be generated prior to performing an AKA with the network. In some examples, the secured query message may include an access request, a network capability query, a service query, or a combination thereof. The operation(s) at block 1910 may be performed using the wireless communication manager 1120 described with reference to FIG. 1, 11, 12, or 14, the secured query message generator 1135 described with reference to FIG. 11 or 12, or the public key-based cryptography manager 1230 described with reference to FIG. 12.

At block 1915, the method 1900 may include transmitting the secured query message to the network, using the secure connection established at 1905. The operation(s) at block 1915 may be performed using the wireless communication manager 1120 described with reference to FIG. 1, 11, 12, or 14, or the secured query message transmission manager 1140 described with reference to FIG. 11 or 12.

At block 1920, the method 1900 may include receiving a response to the secured query message. In some examples, the response may include an acknowledgement of the secured query message or a message commencing performance of an AKA by the network. In some examples, the response may include a message that causes the wireless communication device a denial of service. The operation(s) at block 1920 may be performed using the wireless communication manager 1120 described with reference to FIG. 1, 11, 12, or 14, or the response processor 1145 described with reference to FIG. 11 or 12.

At block 1925, the method 1900 may include determining whether to perform the AKA with the network based at least in part on the received response (i.e., the response received at block 1920). When performed, and in some examples, the AKA may be performed using the secure connection established at block 1905. The operation(s) at block 1925 may be performed using the wireless communication manager 1120 described with reference to FIG. 1, 11, 12, or 14, or the AKA manager 1150 described with reference to FIG. 11 or 12.

At block 1930, the method 1900 may optionally include obtaining at least one of: a first security credential of a roaming MNO from a first mobile network of a home MNO for the wireless communication device; or a second security credential of the roaming MNO from a second mobile network of the roaming MNO, where the second security credential is signed by the home MNO; or a third security credential of the roaming MNO from a certificate authority common to the home MNO and the roaming MNO; or a combination thereof. The operation(s) at block 1930 may be performed using the wireless communication manager 1120 described with reference to FIG. 1, 11, 12, or 14, or the pre-AKA security manager 1205 or roaming security manager 1220 described with reference to FIG. 12.

Figure 20:
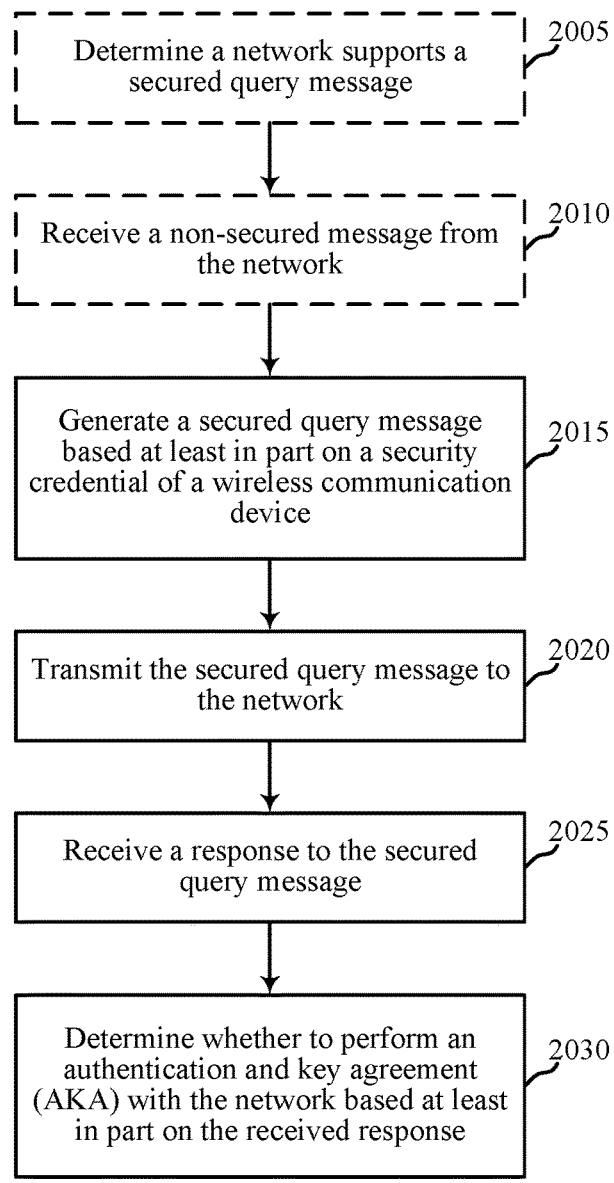
FIG. 20 is a flow chart illustrating an example of a method of wireless communication at a wireless communication device, in accordance with one or more aspects of the present disclosure.

FIG. 20 is a flow chart illustrating an example of a method 2000 of wireless communication at a wireless communication device, in accordance with one or more aspects of the present disclosure. For clarity, the method 2000 is described below with reference to aspects of one of the UE 115 described with reference to FIG. 1, 3, 4, 5, 10, or 15, aspects of the apparatus 1115 described with reference to FIG. 11, or aspects of one of the wireless communication managers 1120 described with reference to FIG. 1, 11, 12, or 14. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 2005, the method 2000 may optionally include determining a network supports receipt of a secured query message. In some examples, the determining may be based at least in part on a network advertisement. The operation(s) at block 2005 may be performed using the wireless communication manager 1120 described with reference to FIG. 1, 11, 12, or 14, or the pre-AKA security manager 1205 or supported security determiner 1210 described with reference to FIG. 12.

At block 2010, the method 2000 may optionally include receiving a non-secured message from the network. In some examples, the non-secured message may include a demand to transmit a message, perform an AKA, etc. The operation(s) at block 2010 may be performed using the wireless communication manager 1120 described with reference to FIG. 1, 11, 12, or 14, or the non-secured message processor 1225 described with reference to FIG. 12.

At block 2015, the method 2000 may include generating a secured query message based at least in part on a security credential of the wireless communication device. The secured query message may be generated prior to performing an AKA with the network. In some examples, the secured query message may include an access request, a network capability query, a service query, or a combination thereof. In some examples, the secured query message may be generated in response to a non-secured message received at block 2010. In some examples, the secured query message may be generated based at least in part on a type of security determined at block 2005. The operation(s) at block 2015 may be performed using the wireless communication manager 1120 described with reference to FIG. 1, 11, 12, or 14, or the secured query message generator 1135 described with reference to FIG. 11 or 12.

At block 2020, the method 2000 may include transmitting the secured query message to the network. The operation(s) at block 2020 may be performed using the wireless communication manager 1120 described with reference to FIG. 1, 11, 12, or 14, or the secured query message transmission manager 1140 described with reference to FIG. 11 or 12.

At block 2025, the method 2000 may include receiving a response to the secured query message. In some examples, the response may include an acknowledgement of the secured query message or a message commencing performance of an AKA by the network. In some examples, the response may include a message that causes the wireless communication device a denial of service. The operation(s) at block 2025 may be performed using the wireless communication manager 1120 described with reference to FIG. 1, 11, 12, or 14, or the response processor 1145 described with reference to FIG. 11 or 12.

At block 2030, the method 2000 may include determining whether to perform the AKA with the network based at least in part on the received response (i.e., the response received at block 2025). The operation(s) at block 2030 may be performed using the wireless communication manager 1120 described with reference to FIG. 1, 11, 12, or 14, or the AKA manager 1150 described with reference to FIG. 11 or 12.

Figure 21:
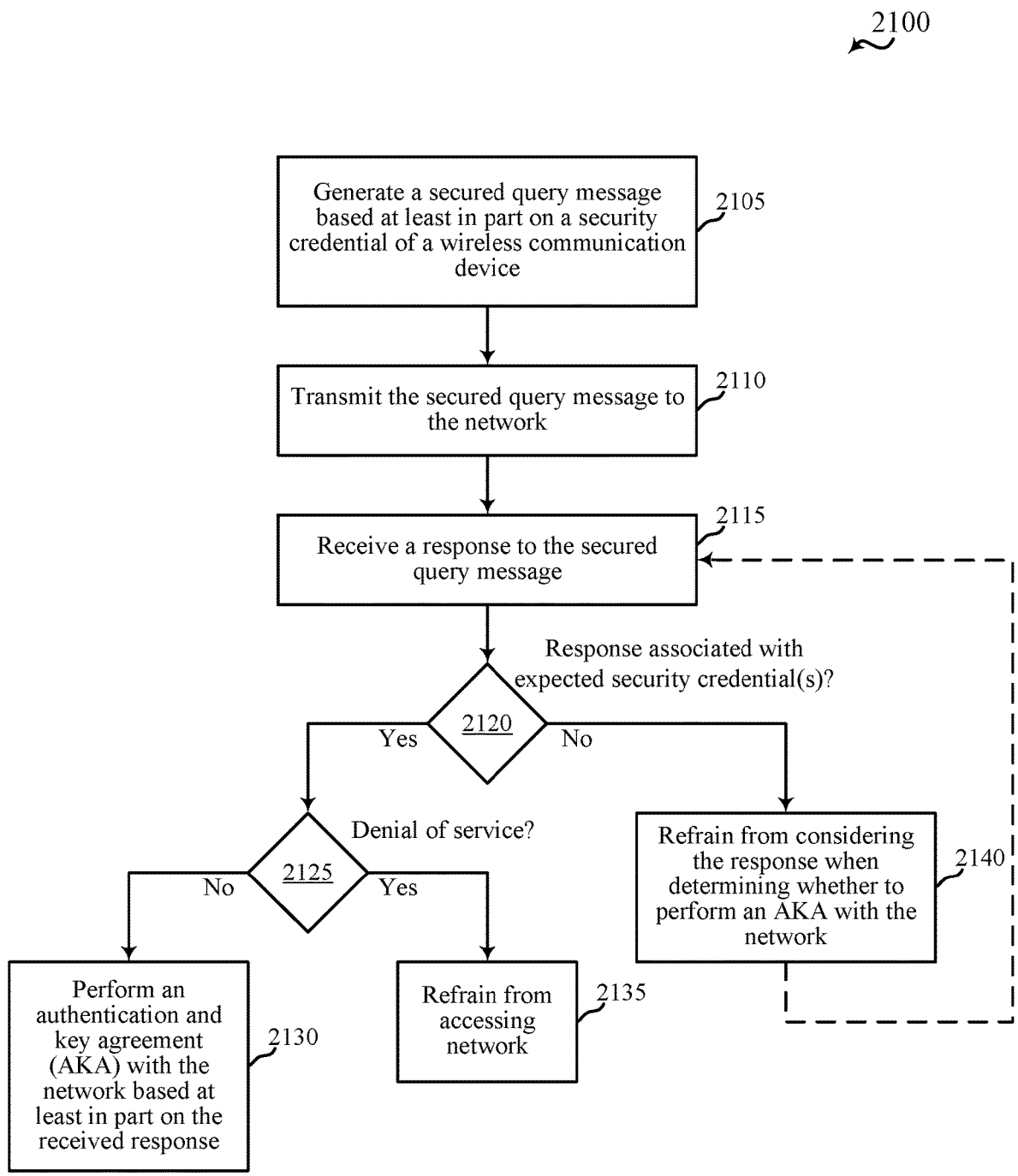
FIG. 21 is a flow chart illustrating an example of a method of wireless communication at a wireless communication device, in accordance with one or more aspects of the present disclosure.

FIG. 21 is a flow chart illustrating an example of a method 2100 of wireless communication at a wireless communication device, in accordance with one or more aspects of the present disclosure. For clarity, the method 2100 is described below with reference to aspects of one of the UE 115 described with reference to FIG. 1, 3, 4, 5, 10, or 15, aspects of the apparatus 1115 described with reference to FIG. 11, or aspects of one of the wireless communication managers 1120 described with reference to FIG. 1, 11, 12, or 14. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 2105, the method 2100 may include generating a secured query message based at least in part on a security credential of the wireless communication device. The secured query message may be generated prior to performing an AKA with a network. In some examples, the secured query message may include an access request, a network capability query, a service query, or a combination thereof. The operation(s) at block 2105 may be performed using the wireless communication manager 1120 described with reference to FIG. 1, 11, 12, or 14, or the secured query message generator 1135 described with reference to FIG. 11 or 12.

At block 2110, the method 2100 may include transmitting the secured query message to the network. The operation(s) at block 2110 may be performed using the wireless communication manager 1120 described with reference to FIG. 1, 11, 12, or 14, or the secured query message transmission manager 1140 described with reference to FIG. 11 or 12.

At block 2115, the method 2100 may include receiving a response to the secured query message. In some examples, the response may include an acknowledgement of the secured query message or a message commencing performance of an AKA by the network. In some examples, the response may include a message that causes the wireless communication device a denial of service. The operation(s) at block 2115 may be performed using the wireless communication manager 1120 described with reference to FIG. 1, 11, 12, or 14, or the response processor 1145 described with reference to FIG. 11 or 12.

At one or more of blocks 2120, 2125, 2130, 2135, or 2140, the method 2100 may include determining whether to perform an AKA with the network, and in some cases may include performing an AKA with the network. At block 2120, the method 2100 may include determining whether the response received at block 2115 is associated with expected security credentials (e.g., the security credential of the wireless communication device and a network security credential of the network). Upon determining that the response received at block 2115 is associated with expected security credential(s), the method 2100 may continue at block 2125. Upon determining that the response received at block 2115 is not associated with expected security credential(s), the method 2100 may continue at block 2140. The operation(s) at block 2120 may be performed using the wireless communication manager 1120 described with reference to FIG. 1, 11, 12, or 14, or the response processor 1145 described with reference to FIG. 11 or 12.

At block 2125, the method 2100 may include determining whether the response received at block 2115 includes a message that causes the wireless communication device a denial of service. Upon determining that the response received at block 2105 does not cause the wireless communication device a denial of service, the method 2100 may continue at block 2130. Upon determining that the response received at block 2105 causes the wireless communication device a denial of service, the method 2100 may continue at block 2135. The operation(s) at block 2125 may be performed using the wireless communication manager 1120 described with reference to FIG. 1, 11, 12, or 14, or the response processor 1145 described with reference to FIG. 11 or 12.

At block 2130, the method 2100 may include performing an AKA with the network based at least in part on the received response (i.e., the response received at block 2115). The operation(s) at block 2120 may be performed using the wireless communication manager 1120 described with reference to FIG. 1, 11, 12, or 14, or the AKA manager 1150 described with reference to FIG. 11 or 12.

At block 2135, the method 2100 may include refraining from accessing the network. The operation(s) at block 2135 may be performed using the wireless communication manager 1120 described with reference to FIG. 1, 11, 12, or 14, or the response processor 1145 described with reference to FIG. 11 or 12.

At block 2140, the method 2100 may include refraining from considering the response received at block 2115 when determining whether to perform an AKA with the network. The operation(s) at block 2140 may be performed using the wireless communication manager 1120 described with reference to FIG. 1, 11, 12, or 14, the response processor 1145 described with reference to FIG. 11 or 12, or the attack identifier 1240 described with reference to FIG. 12.

Following block 2140, the method 2100 may optionally include receiving another response to the secured query message at block 2115, and processing the additional response at one or more of blocks 2120, 2125, 2130, 2135, or 2140.

In some examples, aspects of the method 1800, 1900, 2000, or 2100 described with reference to FIGS. 18-21 may be combined.

Figure 22:
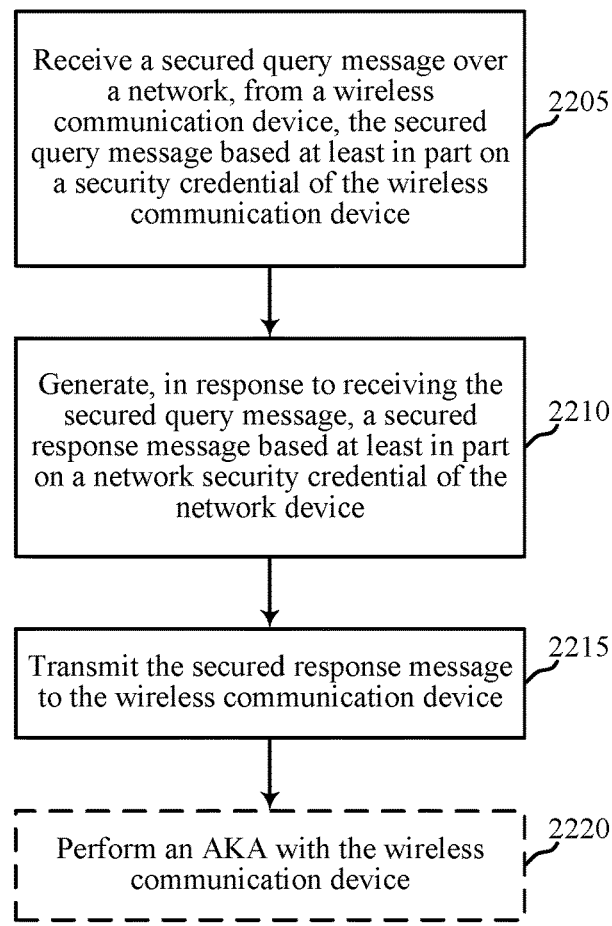
FIG. 22 is a flow chart illustrating an example of a method of wireless communication at a network device, in accordance with one or more aspects of the present disclosure.

FIG. 22 is a flow chart illustrating an example of a method 2200 of wireless communication at a network device, in accordance with one or more aspects of the present disclosure. For clarity, the method 2200 is described below with reference to aspects of one of the network access devices 105 (e.g., a radio head, a base station, an eNB, or an ANC) described with reference to FIG. 1 or 16, aspects of one of the network devices 405 described with reference to FIG. 4, 5, or 10, aspects of a central node 1705 (e.g., a node of the core network 130 described with reference to FIG. 1 or 16), aspects of the apparatus 1305 described with reference to FIG. 13, or aspects of one of the wireless communication managers 1320 described with reference to FIG. 1, 13, 14, 16, or 17. In some examples, a network device may execute one or more sets of codes to control the functional elements of the network device to perform the functions described below. Additionally or alternatively, the network device may perform one or more of the functions described below using special-purpose hardware.

At block 2205, the method 2200 may include receiving a secured query message over a network, from a wireless communication device, prior to performing an AKA with the wireless communication device. The secured query message may be based at least in part on a security credential of the wireless communication device. In some examples, the secured query message may include an access request, a network capability query, a service query, or a combination thereof. The operation(s) at block 2205 may be performed using the wireless communication manager 1320 described with reference to FIG. 1, 13, 14, 16, or 17, or the secured query message processor 1335 described with reference to FIG. 13 or 14.

At block 2210, the method 2200 may include generating, in response to receiving the secured query message, a secured response message based at least in part on a network security credential of the network device. In some examples, the response may include an acknowledgement of the secured query message or a message commencing performance of an AKA by the network. In some examples, the secured response message may include a message that causes the wireless communication device a denial of service. The operation(s) at block 2210 may be performed using the wireless communication manager 1320 described with reference to FIG. 1, 13, 14, 16, or 17, or the secured response message generator 1340 described with reference to FIG. 13 or 14.

At block 2215, the method 2200 may include transmitting the secured response message to the wireless communication device. The operation(s) at block 2215 may be performed using the wireless communication manager 1320 described with reference to FIG. 1, 13, 14, 16, or 17, or the secured response message transmission manager 1345 described with reference to FIG. 13 or 14.

At block 2220, the method 2200 may optionally include performing an AKA with the wireless communication device. The operation(s) at block 2220 may be performed using the wireless communication manager 1320 described with reference to FIG. 1, 13, 14, 16, or 17, or the AKA manager 1440 described with reference to FIG. 14.

In some examples of the method 2200, the secured query message received at block 2205 may also or alternatively be based at least in part on the network security credential of the network. In some examples of the method 2200, the secured response message generated at block 2210 may also or alternatively be based at least in part on the security credential of the wireless communication device. In some examples, the secured query message or secured response message may be secured based at least in part on pairing-based cryptography, as described, for example, with reference to FIG. 9 or 10. In some examples, the pairing-based cryptography may include an identity-based encryption, an identity-based signature, or a combination thereof.

Figure 23:
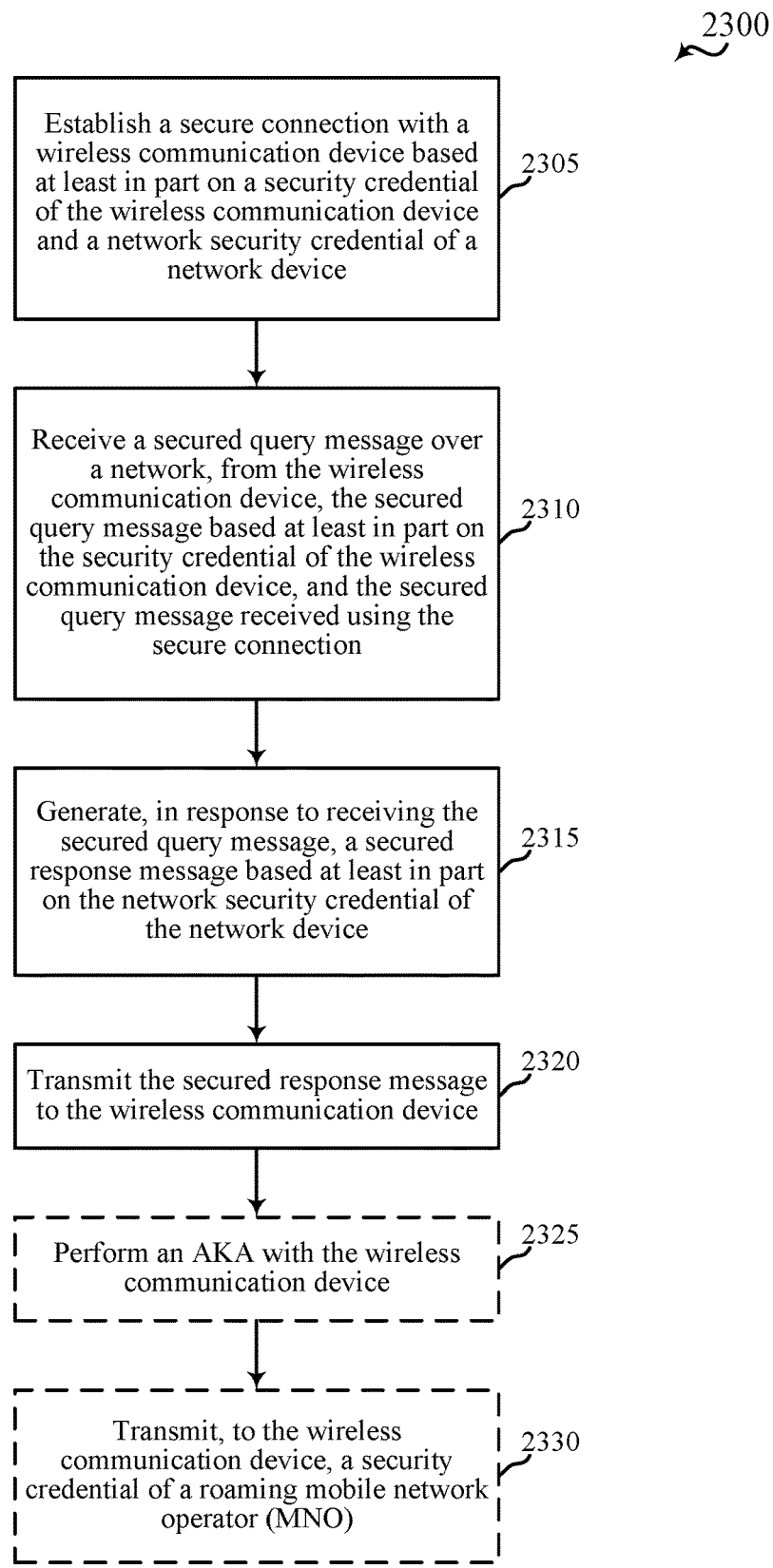
FIG. 23 is a flow chart illustrating an example of a method of wireless communication at a network device, in accordance with one or more aspects of the present disclosure.

FIG. 23 is a flow chart illustrating an example of a method 2300 of wireless communication at a network device, in accordance with one or more aspects of the present disclosure. For clarity, the method 2300 is described below with reference to aspects of one of the network access devices 105 (e.g., a radio head, a base station, an eNB, or an ANC) described with reference to FIG. 1 or 16, aspects of one of the network devices 405 described with reference to FIG. 4, 5, or 10, aspects of a central node 1705 (e.g., a node of the core network 130 described with reference to FIG. 1 or 16), aspects of the apparatus 1305 described with reference to FIG. 13, or aspects of one of the wireless communication managers 1320 described with reference to FIG. 1, 13, 14, 16, or 17. In some examples, a network device may execute one or more sets of codes to control the functional elements of the network device to perform the functions described below. Additionally or alternatively, the network device may perform one or more of the functions described below using special-purpose hardware.

At block 2305, the method 2300 may include establishing a secure connection with a wireless communication device based at least in part on a security credential of the wireless communication device and a network security credential of the network device, as described, for example, with reference to FIG. 2, 3, or 4. In some examples, the network device performing the method 2300 may include part of a core network (e.g., a MME). In these (and other) examples, establishing the secure connection may include performing a TLS handshake over a NAS. In other examples, the network device performing the method 2300 may include a network access device (e.g., a radio head, base station, eNB, or ANC). In these (and other) examples, establishing the secure connection may include performing a TLS handshake over a RRC connection. The operation(s) at block 2305 may be performed using the wireless communication manager 1320 described with reference to FIG. 1, 13, 14, 16, or 17, or the pre-AKA security manager 1405 or TLS handshake manager 1415 described with reference to FIG. 14.

At block 2310, the method 2300 may include receiving a secured query message over the network, from the wireless communication device, prior to performing an AKA with the wireless communication device. The secured query message may be based at least in part on the security credential of the wireless communication device, and may be received using the secure connection established at 2305. In some examples, the secured query message may include an access request, a network capability query, a service query, or a combination thereof. The operation(s) at block 2310 may be performed using the wireless communication manager 1320 described with reference to FIG. 1, 13, 14, 16, or 17, or the secured query message processor 1335 described with reference to FIG. 13 or 14.

At block 2315, the method 2300 may include generating, in response to receiving the secured query message, a secured response message based at least in part on a network security credential of the network device, as described, for example, with reference to FIG. 2, 3, or 4. In some examples, the response may include an acknowledgement of the secured query message or a message commencing performance of an AKA by the network. In some examples, the secured response message may include a message that causes the wireless communication device a denial of service. The operation(s) at block 2315 may be performed using the wireless communication manager 1320 described with reference to FIG. 1, 13, 14, 16, or 17, or the secured response message generator 1340 described with reference to FIG. 13 or 14.

At block 2320, the method 2300 may include transmitting the secured response message to the wireless communication device. The operation(s) at block 2320 may be performed using the wireless communication manager 1320 described with reference to FIG. 1, 13, 14, 16, or 17, or the secured response message transmission manager 1345 described with reference to FIG. 13 or 14.

At block 2325, the method 2300 may optionally include performing an AKA with the wireless communication device. In some examples, the AKA may be performed using the secure connection established at block 2305. The operation(s) at block 2325 may be performed using the wireless communication manager 1320 described with reference to FIG. 1, 13, 14, 16, or 17, or the AKA manager 1440 described with reference to FIG. 14.

At block 2330, the method 2300 may optionally include transmitting, to the wireless communication device, a security credential of a roaming MNO. The security credential of the roaming MNO may be transmitted to the wireless communication device over a first mobile network of a home MNO with which the network device and wireless communication device are associated. The operation(s) at block 2330 may be performed using the wireless communication manager 1320 described with reference to FIG. 1, 13, 14, 16, or 17, or the pre-AKA security manager 1405 or roaming security manager 1420 described with reference to FIG. 14.

Figure 24:
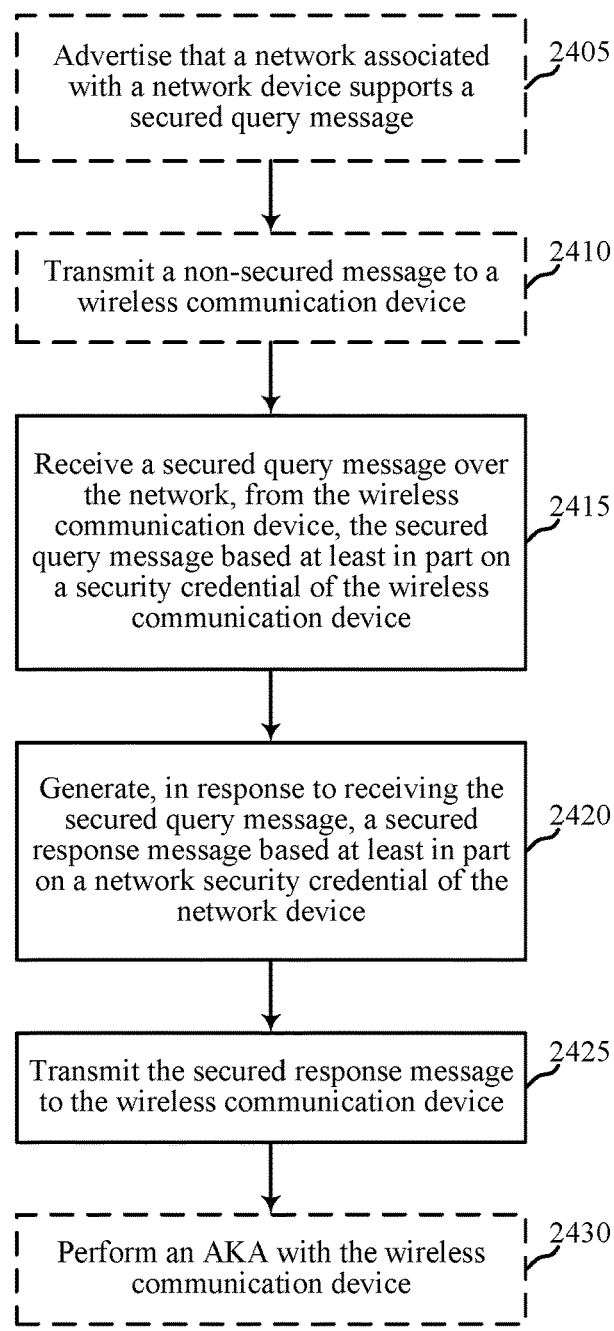
FIG. 24 is a flow chart illustrating an example of a method of wireless communication at a network device, in accordance with one or more aspects of the present disclosure.

FIG. 24 is a flow chart illustrating an example of a method 2400 of wireless communication at a network device, in accordance with one or more aspects of the present disclosure. For clarity, the method 2400 is described below with reference to aspects of one of the network access devices 105 (e.g., a radio head, a base station, an eNB, or an ANC) described with reference to FIG. 1 or 16, aspects of one of the network devices 405 described with reference to FIG. 4, 5, or 10, aspects of a central node 1705 (e.g., a node of the core network 130 described with reference to FIG. 1 or 16), aspects of the apparatus 1305 described with reference to FIG. 13, or aspects of one of the wireless communication managers 1320 described with reference to FIG. 1, 13, 14, 16, or 17. In some examples, a network device may execute one or more sets of codes to control the functional elements of the network device to perform the functions described below. Additionally or alternatively, the network device may perform one or more of the functions described below using special-purpose hardware.

At block 2405, the method 2400 may optionally include advertising that a network associated with the network device supports a secured query message. In some examples, the advertising may include broadcasting a network advertisement over the network. In some examples, the advertising may be performed by a device other than the network device that performs the method 2400. The operation(s) at block 2405 may be performed using the wireless communication manager 1320 described with reference to FIG. 1, 13, 14, 16, or 17, or the pre-AKA security manager 1405 or supported security advertiser 1410 described with reference to FIG. 14.

At block 2410, the method 2400 may optionally include transmitting a non-secured message to a wireless communication device. In some examples, the non-secured message may include a demand to transmit a message, perform an AKA, etc. The operation(s) at block 2410 may be performed using the wireless communication manager 1320 described with reference to FIG. 1, 13, 14, 16, or 17, or the non-secured messaging manager 1425 described with reference to FIG. 14.

At block 2415, the method 2400 may include receiving a secured query message over the network, from the wireless communication device, prior to performing an AKA with the wireless communication device. The secured query message may be based at least in part on a security credential of the wireless communication device. In some examples, the secured query message may include an access request, a network capability query, a service query, or a combination thereof. In some examples, the secured query message may be received in response to transmission of a non-secured message at block 2410. The operation(s) at block 2415 may be performed using the wireless communication manager 1320 described with reference to FIG. 1, 13, 14, 16, or 17, or the secured query message processor 1335 described with reference to FIG. 13 or 14.

At block 2420, the method 2400 may include generating, in response to receiving the secured query message, a secured response message based at least in part on a network security credential of the network device. In some examples, the response may include an acknowledgement of the secured query message or a message commencing performance of an AKA by the network. In some examples, the secured response message may include a message that causes the wireless communication device a denial of service. The operation(s) at block 2420 may be performed using the wireless communication manager 1320 described with reference to FIG. 1, 13, 14, 16, or 17, or the secured response message generator 1340 described with reference to FIG. 13 or 14.

At block 2425, the method 2400 may include transmitting the secured response message to the wireless communication device. The operation(s) at block 2425 may be performed using the wireless communication manager 1320 described with reference to FIG. 1, 13, 14, 16, or 17, or the secured response message transmission manager 1345 described with reference to FIG. 13 or 14.

At block 2430, the method 2400 may optionally include performing an AKA with the wireless communication device. The operation(s) at block 2430 may be performed using the wireless communication manager 1320 described with reference to FIG. 1, 13, 14, 16, or 17, or the AKA manager 1440 described with reference to FIG. 14.

In some examples, aspects of the method 2200, 2300, or 2400 described with reference to FIGS. 22-24 may be combined.

The methods 1800, 1900, 2000, 2100, 2200, 2300, and 2400 described with reference to FIGS. 18, 19, 20, 21, 22, 23, and 24 may provide for wireless communication. It should be noted that the methods 1800, 1900, 2000, 2100, 2200, 2300, and 2400 are just example implementations, and the operations of the methods 1800, 1900, 2000, 2100, 2200, 2300, and 2400 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication at a wireless communication device, comprising:
   generating a secured query message based at least in part on a cryptography based security credential of the wireless communication device, wherein the secured query message comprises an indication of cipher suites supported by the wireless communication device and is generated prior to performing an authentication and key agreement (AKA) with a network;
   transmitting, to a network device, the secured query message to the network prior to performing the AKA with the network;
   receiving, from the network device, a response to the secured query message prior to performing the AKA with the network, wherein the response includes a network security credential;
   transmitting, to the network device, a first message including an encrypted pre-master secret based at least in part on the network security credential;
   receiving, from the network device, a second message based at least in part on the transmitted first message including the encrypted pre-master secret;
   determining whether the wireless communication device and the network device derived the same session key based at least in part on the received second message; and
   determining whether to perform the AKA with the network based at least in part on the determination of whether the wireless communication device and the network device derived the same session key.

2. The method of claim 1, further comprising:
   establishing a secure connection with the network based at least in part on the cryptography based security credential of the wireless communication device and the network security credential of the network;
   wherein the secured query message is transmitted to the network using the secure connection.

3. The method of claim 2, wherein establishing the secure connection comprises:
   establishing the secure connection with a core network.

4. The method of claim 2, wherein establishing the secure connection comprises:
   performing a transport layer security (TLS) handshake over a non-access stratum (NAS).

5. The method of claim 2, wherein establishing the secure connection comprises:
   establishing the secure connection with a network access device.

6. The method of claim 2, wherein establishing the secure connection comprises:
   performing a TLS handshake over a radio resource control (RRC) connection.

7. The method of claim 2, further comprising:
   performing the AKA using the secure connection.

8. The method of claim 2, wherein the wireless communication device is associated with a first mobile network of a home mobile network operator (MNO), the method further comprising obtaining at least one of:
   a first security credential of a roaming MNO from the first mobile network; or a second security credential of the roaming MNO from a second mobile network of the roaming MNO, the second security credential signed by the home MNO; or a third security credential of the roaming MNO from a certificate authority common to the home MNO and the roaming MNO; or a combination thereof.

9. The method of claim 1, further comprising:
determining the response is not associated with: the cryptography based security credential of the wireless communication device, the network security credential of the network, or a combination thereof; and
refraining from considering the response when determining whether to perform the AKA with the network.

10. The method of claim 1, further comprising:
determining the network supports receipt of the secured query message.

11. The method of claim 10, wherein the determining is based at least in part on a network advertisement.

12. The method of claim 1, further comprising:
receiving a non-secured message from the network;
wherein the secured query message is generated in response to the non-secured message.

13. The method of claim 1, wherein the secured query message is further generated based at least in part on the network security credential of the network.

14. The method of claim 1, wherein the secured query message is secured based at least in part on pairing-based cryptography.

15. The method of claim 14, wherein the pairing-based cryptography comprises at least one of:
an identity-based encryption, an identity-based signature, or a combination thereof.

16. The method of claim 1, further comprising:
determining the response is associated with the cryptography based security credential of the wireless communication device and the network security credential of the network; and
determining whether to perform the AKA with the network based at least in part on the response.

17. The method of claim 1, wherein the secured query message comprises:
an access request, a network capability query, a service query, or a combination thereof.

18. The method of claim 1, wherein the response comprises a message that causes the wireless communication device a denial of service.

19. A method for wireless communication at a network device, comprising:
receiving a secured query message over a network, from a wireless communication device, prior to performing an authentication and key agreement (AKA) with the wireless communication device, wherein the secured query message comprises an indication of cipher suites supported by the wireless communication device and is based at least in part on a cryptography based security credential of the wireless communication device;
generating, in response to receiving the secured query message, a secured response message based at least in part on a network security credential of the network device;
transmitting the secured response message to the wireless communication device prior to performing the AKA with the wireless communication device;
receiving a first message including an encrypted pre-master secret based at least in part on the network security credential; and
deriving a session key based at least in part on the encrypted pre-master secret; and
transmitting a second message based at least in part on the derived session key.

20. The method of claim 19, further comprising:
establishing a secure connection with the wireless communication device based at least in part on the cryptography based security credential of the wireless communication device and the network security credential of the network device;
wherein the secured query message is received over the network using the secure connection.

21. The method of claim 20, wherein the network device comprises at least one of:
a network access device, a core network device, or a combination thereof.

22. The method of claim 20, wherein the secure connection comprises a transport layer security (TLS) handshake over a non-access stratum (NAS).

23. The method of claim 20, wherein the secure connection comprises a TLS handshake over a radio resource control (RRC) connection.

24. The method of claim 20, further comprising:
performing the AKA with the wireless communication device using the secure connection.

25. The method of claim 20, wherein the wireless communication device and the network device are associated with a first mobile network of a home mobile network operator (MNO), the method further comprising:
transmitting to the wireless communication device, over the first mobile network, a security credential of a roaming MNO.

26. The method of claim 19, wherein the secured query message is further based at least in part on the network security credential of the network device.

27. The method of claim 19, wherein the secured query message is secured based at least in part on pairing-based cryptography.

28. The method of claim 19, wherein the secured query message comprises:
an access request, a network capability query, a service query, or a combination thereof.

29. An apparatus for wireless communication, comprising:
a processor;
memory in electronic communication with the processor; and
the processor and the memory configured to:
generate a secured query message based at least in part on a cryptography based security credential of the wireless communication apparatus, wherein the secured query message comprises an indication of cipher suites supported by the wireless communication apparatus and is generated prior to performing an authentication and key agreement (AKA) with a network;
transmit, to a network device, the secured query message to the network prior to performing the AKA with the network;
receive, from the network device, a response to the secured query message prior to performing the AKA with the network, wherein the response includes a network security credential;
transmit, to the network device, a first message including an encrypted pre-master secret based at least in part on the network security credential;
receive, from the network device, a second message based at least in part on the transmitted first message including the encrypted pre-master secret;

determine whether the wireless communication apparatus and the network device derived the same session key based at least in part on the received second message; and determine whether to perform the AKA with the network based at least in part on the determination of whether the wireless communication apparatus and the network device derived the same session key.

30. A non-transitory computer-readable medium storing computer-executable code for wireless communication, the code comprising instructions executable to:

generate a secured query message based at least in part on a cryptography based security credential of a wireless communication device, wherein the secured query message comprises an indication of cipher suites supported by the wireless communication device and is generated prior to performing an authentication and key agreement (AKA) with a network;

transmit, to a network device, the secured query message to the network prior to performing the AKA with the network;

receive, from the network device, a response to the secured query message prior to performing the AKA with the network, wherein the response includes a network security credential;

transmit, to the network device, a first message including an encrypted pre-master secret based at least in part on the network security credential;

receive, from the network device, a second message based at least in part on the transmitted first message including the encrypted pre-master secret;

determine whether the wireless communication apparatus and the network device derived the same session key based at least in part on the received second message; and determine whether to perform the AKA with the network based at least in part on the determination of whether the wireless communication apparatus and the network device derived the same session key.

* * * * *